US012121910B2

(12) United States Patent
Manyapu et al.

(10) Patent No.: US 12,121,910 B2
(45) **Date of Patent: *Oct. 22, 2024**

(54) DUST MITIGATION SYSTEM UTILIZING CONDUCTIVE FIBERS

(71) Applicant: The Boeing Company, Chicago, IL (US)

(72) Inventors: Kavya K. Manyapu, Friendswood, TX (US); Leora Peltz, Pasadena, CA (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,703

(22) Filed: Apr. 12, 2023

(65) Prior Publication Data

US 2023/0241627 A1 Aug. 3, 2023

Related U.S. Application Data

(63) Continuation of application No. 16/028,316, filed on Jul. 5, 2018, now Pat. No. 11,654,442, which is a (Continued)

(51) Int. Cl.

| | |
|---|---|
| ***B03C 3/60*** | (2006.01) |
| ***B03C 3/41*** | (2006.01) |
| ***B08B 17/02*** | (2006.01) |

(52) U.S. Cl.

CPC .................. *B03C 3/60* (2013.01); *B03C 3/41* (2013.01); *B08B 17/02* (2013.01)

(58) Field of Classification Search

CPC .... B03C 3/00; B03C 3/41; B03C 3/60; B08B 17/00; B08B 17/02

(Continued)

(56) References Cited

U.S. PATENT DOCUMENTS

| | | | |
|---|---|---|---|
| 4,534,856 | A | 8/1985 | Weiss et al. |
| 10,016,766 | B2 | 7/2018 | Manyapu et al. |

(Continued)

FOREIGN PATENT DOCUMENTS

| | | |
|---|---|---|
| JP | S48-002454 | 1/1973 |
| KR | 10-1434175 | 8/2014 |
| WO | 2005/045112 A1 | 5/2005 |

OTHER PUBLICATIONS

English translation of Notice of Reasons for Rejection prepared by the Japanese Patent Office in Application No. 2019-126602 issued Sep. 5, 2023.

(Continued)

*Primary Examiner* — Lars A Olson

(74) *Attorney, Agent, or Firm* — McDonnell Boehnen Hulbert Berghoff LLP

(57) ABSTRACT

A Dust Mitigation System ("DMS") is disclosed that includes a fabric-material having a front-surface and a back-surface; a plurality of conductive-fibers within the fabric-material; and a plurality of input-nodes approximately adjacent to the back-surface or the front-surface of the fabric-material. The plurality of conductive-fibers are approximately parallel in a first direction along the fabric-material and are approximately adjacent to the front-surface of the fabric-material and the plurality of input-nodes are in signal communication with the plurality of conductive-fibers and configured to receive an alternating-current ("AC") voltage-signal from an input-signal-source. The plurality of conductive-fibers are configured to generate an electric-field on the front-surface of the fabric-material in response to the plurality of input-nodes receiving the AC voltage-signal from the input-signal-source and a traveling-wave (from the electric-field) that travels along the front-surface of the (Continued)

fabric-material in a second direction that is transverse to the first direction.

20 Claims, 22 Drawing Sheets

Related U.S. Application Data continuation of application No. 15/199,618, filed on Jun. 30, 2016, now Pat. No. 10,016,766.

(60) Provisional application No. 62/312,931, filed on Mar. 24, 2016.

(58) Field of Classification Search
USPC ........................................................ 95/3
See application file for complete search history.

(56) References Cited

U.S. PATENT DOCUMENTS

| | | | | |
|---|---|---|---|---|
| 11,654,442 | B2 * | 5/2023 | Manyapu | B03C 3/60 95/3 |
| 2004/0055632 | A1 | 3/2004 | Mazumder et al. | |
| 2008/0060101 | A1 | 3/2008 | Cadogan | |
| 2013/0263393 | A1 | 10/2013 | Mazumder | |
| 2013/0298399 | A1 | 11/2013 | Trigwell et al. | |
| 2017/0274390 | A1 | 9/2017 | Manyapu et al. | |

OTHER PUBLICATIONS

Decision of Rejection issued by the Japanese Patent Office in application No. 2017-048548, issued Sep. 28, 2021.
Nima Afshar-Moharjer et al., "Review of dust transport and mitigation technologies in lunar and Martian atmospheres", Advances in Space Research, vol. 56, 2015, pp. 1222-1241.
Kavya K. Manyapu et al., "Investigating the Feasibility of Utilizing Carbon Nanotube Fibers for Spacesuit Dust Mitigation", 46th International Conference on Environment Systems, Jul. 10-14, 2016, Vienna, Austria, available from https://ntrs.nasa.gov/archive/nasa/casi.ntrs.nasa.gov/20160008971.pdf [accessed Aug. 29, 2010].
Combined Search and Examination Report prepared by the United Kingdom Intellectual Property Office in application No. GB 1911053.5 dated Sep. 2, 2019.
Notice of Reasons for Rejection issued by the Japanese Patent Office in application No. 2017-048548, issued Mar. 30, 2021.
Kawamoto, "Mitigation of lunar dust adhered to mechanical parts of equipment used for lunar exploration", Journal of Electrostatics, vol. 69, No. 4, Aug. 2011, pp. 365-369.
Kawamoto, "Electrostatic Cleaning Device for Removing Lunar Dust Adhered to Spacesuits", Journal of Aerospace Engineering, vol. 25, No. 3, Jul. 2012, pp. 470-473.
Kawamoto, "Dynamics of Electromagnetic Particles and Application for Space Technology", Journal of the Institute of Electrostatics Japan, Dec. 10, 2012, vol. 36, No. 6, p. 326-331.
Combined Search and Examination Report under Sections 17 and 18(3) prepared by the Intellectual Property Office of the United Kingdom in application No. GB 2003446.8 dated Jun. 25, 2020.
Kawamoto et al., "Electrostatic Cleaning System for Removing Lunar Dust Adhering to Space Suits", Journal of Aerospace Engineering, vol. 24, No. 4, Oct. 1, 2011, pp. 442-444.
Calle, et al. "Particule Removal of Electrostatic and Dieletrophoretic Forces for Dust Control During Lunar Exploration Missions", Journal of Electrostatics, vol. 67, No. 2-3, May 1, 2009.
QiXia et al., "Mechanism of Dust Removal by a Standing Wave Electric Curtain", Science China Physics, Mechanics and Astronmy, vol. 55, No. 6, Jun. 2012, pp. 1018-1025.
Atten, et al. "Study of Dust Removal by Standing Wave Electric Curtain for Application to Solar Cells on Mars", Conference Record of the 2005 IEEE Industry Applications Conference Fortieth IAS Meeting, IEEE Cat. vol. 1, Oct. 2, 2005, pp. 334-340.
Extended European Search Report prepared by the European Patent Office in application No. 19 18 5161.7 dated Dec. 2, 2019.
Examination Report under Section 18(3) for GB Application No. 1703683.1 from the Intellectual Property Office—United Kingdom; dated Mar. 11, 2019, 3 pages.

* cited by examiner

DUST MITIGATION SYSTEM UTILIZING CONDUCTIVE FIBERS

CROSS-REFERENCE TO RELATED APPLICATION AND CLAIM OF PRIORITY

The present patent application is a continuation of U.S. Nonprovisional application Ser. No. 16/028,316, filed on Jul. 5, 2018, which is a continuation of U.S. Nonprovisional application Ser. No. 15/199,618, filed on Jun. 30, 2016, entitled "Dust Mitigation System Utilizing Conductive Fibers," to Kavya K. Manyapu et al., which issued as U.S. Pat. No. 10,016,777 on Jul. 10, 2018, which nonprovisional application claims priority under 35 U.S.C. § 119(e) to earlier filed U.S. provisional patent application No. 62/312,931, filed on Mar. 24, 2016, and entitled "Dust Mitigation System Utilizing Carbon Nanotube Fibers," both of which applications are hereby incorporated herein by this reference in their entireties.

BACKGROUND

1. Field

The present disclosure relates to dust mitigation, and more, particularly to a dust mitigation system utilizing conductive-fibers.

2. Related Art

Exploration activities preformed on the Moon by both humans and robotic spacecraft occur on a planetary surface that is comprised of unconsolidated fragmental rock material known as the lunar regolith. The lunar surface is covered by several layers of thick regolith formed by high-velocity micrometeoroid impacts, and is characterized by the steady bombardment of charged atomic particles from the sun and the stars. The lunar regolith includes rock fragments and, predominantly, much smaller particles that are generally referred to as lunar soil. From the time of their first interactions with the lunar soil, the NASA Apollo astronauts reported that the lunar soil contained abundant small particles, which have been referred to as "lunar dust" (or just "dust"). This dust had caused several anomalies during the Apollo missions because of the lunar dust's strong tendency to collect on, adhere to, or otherwise contaminate the surface of equipment that were utilized in extravehicular activity ("EVA") operations. Today, lunar dust is formally defined as "lunar soil" particles that are smaller than 20 μm in diameter; however for the purposes of this disclosure the term "lunar dust," "lunar soil," or "dust" may be utilized interchangeably.

Additionally, the Apollo mission also exposed the ability of lunar dust to rapidly degrade spacesuits and impact the mission operations. As an example, the Apollo technical crew debriefings and post-mission reports include numerous references by the Apollo crews to the effects of lunar dust on a range of systems and crew activities during lunar surface operations. Among the EVA systems that were mentioned frequently by the crews in relation to possible lunar dust effects were the Apollo spacesuits that were worn during lunar surface operations. These effects included: 1) dust adhering and damaging spacesuit fabrics and system 2) mechanical problems associated to lunar dust that included problems with fittings and abrasion of suit layers causing suit pressure decay 3) vision obscuration; 4) false instrument readings due to dust clogging sensor inlets; 5) dust coating and contamination causing thermal control problems; 6) loss of traction; 7) clogging of joint mechanisms; 8) abrasion; 9) seal failures; and 10) inhalation and irritation.

As an example, in FIG. 1 an image is shown of a NASA astronaut 100 during the Apollo 17 mission weaver a lunar dust 102 coated spacesuit 104 after an EVA operation. Similarly, in FIG. 2 an image of a spacesuit 200 is shown with a hole (or rip) 202 in the knee section of the spacesuit 200 that was caused by abrasion due to the lunar dust. As such, there is a need for a system and method to mitigate (i.e., remove or minimize) dust prior to sending humans back to either the lunar surface or other similar planetary surface. Moreover, there is also a need for to mitigate dust on Earth because of dust exposed systems such as, for example, flexible solar panels and other flexible systems that may be clogged by dust.

At present, attempted solutions have proposed the utilization of both active and passive methods that have been mostly limited to utilization on rigid surfaces such as solar panels, optical planes, glass structures and thermal radiators. Unfortunately, applying these technologies for spacesuit dust removal have remained a challenge due to the complexity of spacesuit design that includes irregular contours of the spacesuit, flexible structure of the soft areas of the spacesuit and polytretrafluroethylene (as an example, TEFLON® produced by The Chemours Company of Wilmington, Delaware) coated spacesuit material. As such, there is also a need for a system and method for mitigating dust that is compatible with existing fabric-materials for utilization in a spacesuit (for example ortho-fabric or emerging new flexible materials) or other devices/systems utilizing fabric-materials such as, for example, space habitats, inflatable structures, flexible and/or deployable antennas, and flexible solar panels.

SUMMARY

A Dust Mitigation System ("DMS") is disclosed. The DMS includes: a fabric-material having a front-surface and a back-surface; a plurality of conductive-fibers within the fabric-material; and a plurality of input-nodes approximately adjacent to the fabric-material. The plurality of conductive-fibers are approximately parallel in a first direction along the fabric-material and are approximately adjacent to the front-surface of the fabric-material and the plurality of input-nodes are in signal communication with the plurality of conductive-fibers and configured to receive an alternating-current ("AC") voltage-signal from an input-signal-source. The plurality of conductive-fibers are configured to generate an electric-field on the front-surface of the fabric-material in response to the plurality of input-nodes receiving the AC voltage-signal from the input-signal-source and a traveling-wave (from the electric-field) that travels along the front-surface of the fabric-material in a second direction that is approximately transverse to the first direction.

In an example of operation, the DMS performs a method that includes receiving the AC voltage-signal from the input-signal-source at the plurality of input-nodes, generating the electric-field on the front-surface of the fabric-material with the plurality of conductive-fibers, and generating the traveling-wave, from the electric-field, that travels along the front-surface of the fabric-material in the second direction that is at the pre-set angle to the first direction.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The disclosure may be better understood by referring to the following figures. The components in the figures are not necessarily to scale, emphasis instead being placed upon illustrating the principles of the disclosure. In the figures, like reference numerals designate corresponding parts throughout the different views.

DETAILED DESCRIPTION

Figure 1:
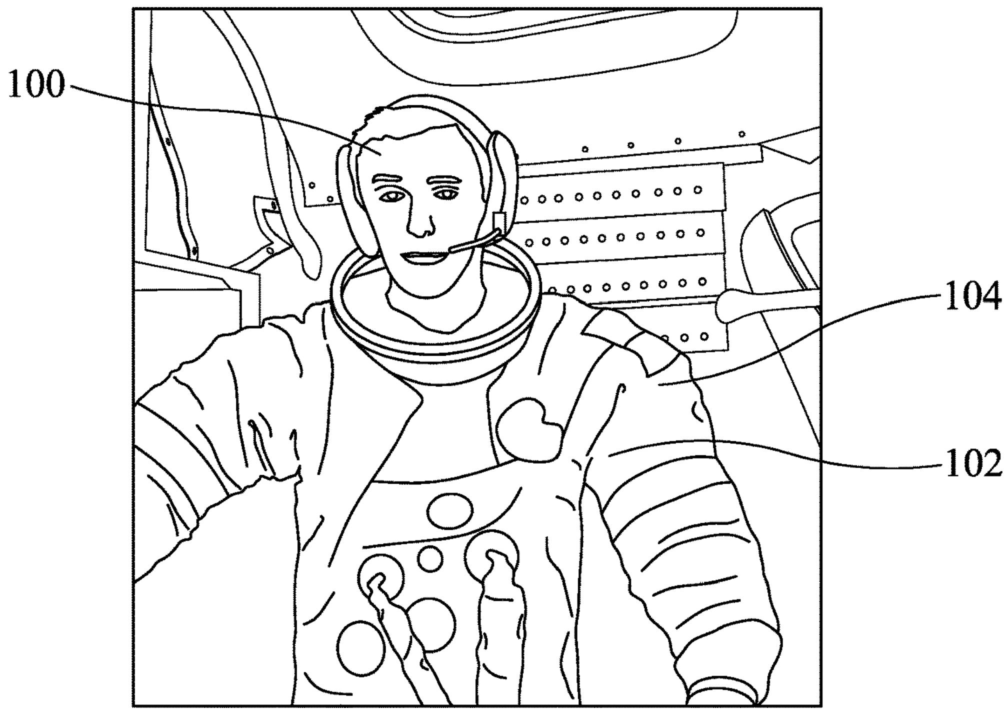
FIG. 1 is an image of a NASA astronaut having a spacesuit contaminated with lunar dust after an EVA operation.
Figure 2:
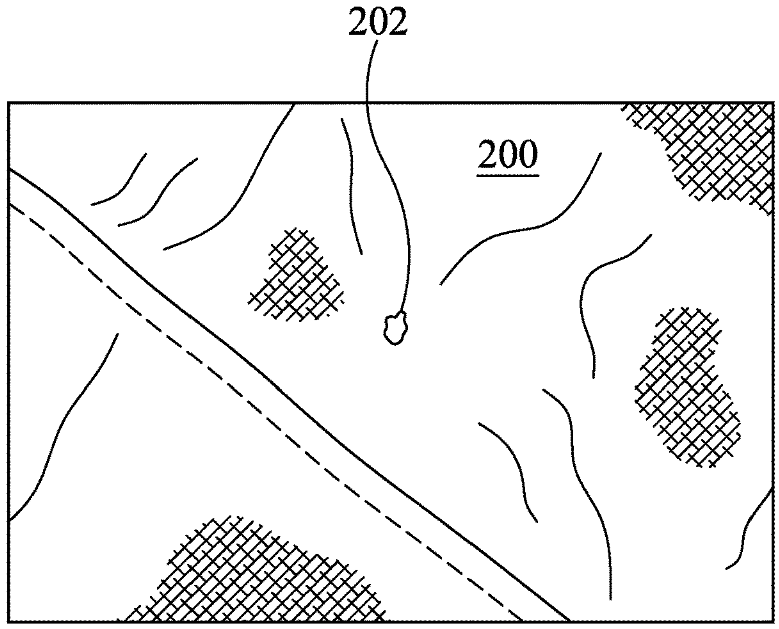
FIG. 2 is an image of a spacesuit with a hole in the knee section of the spacesuit that was caused by abrasion due the lunar dust.

Disclosed is a Dust Mitigation System ("DMS"). The DMS includes: a fabric-material having a front-surface and a back-surface; a plurality of conductive-fibers within the fabric-material; and a plurality of input-nodes approximately adjacent to the fabric-material. The plurality of conductive-fibers are approximately parallel in a first direction along the fabric-material and are approximately adjacent to the front-surface of the fabric-material and the plurality of input-nodes are in signal communication with the plurality of conductive-fibers and configured to receive an alternating-current ("AC") voltage-signal from an input-signal-source. The plurality of conductive-fibers are configured to generate an electric-field on the front-surface of the fabric-material in response to the plurality of input-nodes receiving the AC voltage-signal from the input-signal-source and a traveling-wave (of the electric-field) that travels along the front-surface of the fabric-material in a second direction that is approximately transverse to the first direction. More specifically, the phase of AC voltage-signals in the plurality of conductive-fibers may be adjusted to create the traveling-wave of the electric-field that travels along the front-surface of the fabric-material in a second direction that is approximately transverse to the first direction. By adjusting the phase of the AC voltage-signal or the slight divergence in the angle of the approximately parallel conductive-fibers, the approximate transverse angle of the second direction (i.e., the direction of the travelling-wave) may be adjusted from a transverse angle (i.e., 90 degrees) to a non-transverse angle that is still approximately transverse (i.e., approximately 90 degrees—for example approximately 80 degrees to approximately 120 degrees).

In an example of operation, the DMS performs a method that includes receiving the AC voltage-signal from the input-signal-source at the plurality of input-nodes, generating the electric-field on the front-surface of the fabric-material with the plurality of conductive-fibers, and generating the traveling-wave, from the electric-field, that travels along the front-surface of the fabric-material in the second direction that is at the pre-set angle to the first direction.

The DMS implements an electrodynamic dust shield ("EDS") with active electrodes into a spacesuit, or other device or systems (such as flexible space habitats, deployable structures, etc.) that utilizes fabric-materials or other flexible-materials by utilizing conductive-fibers as electrodes. In this example, the active electrodes are conductive-fibers that may be carbon-nanotube ("CNT") fibers which are flexible electrically conductive-fibers. Generally, EDS technology utilizes electrostatic and/or electrodynamic and/or dielectrophoretic forces to repel dust particles from approaching the surface, and/or carry deposited dust particles off the surface of a material. Repelling of dust particles is accomplished by creating electric fields that levitate the approaching dust particles away from the surface. Deposited dust particles are carried away by breaking the adhesive forces between the dust and the surface due to electrostatics or Van der Waal forces and then levitate the dust away from the surface of the material. The magnitude of the forces repelling, levitating and carrying away dust particles depends on the dielectric properties of the dust particles, the substrate (in this case flexible structures), the size of the dust particles, and the characteristics of the input AC voltage-signals applied. As an example utilizing the DMS, typical electrodynamic forces required to repel dust particles with sizes between about 10 micrometers ("μm") to 75 μm may be generated by applying AC voltage-signals in the range of approximately 800 volts ("V") to 1,200V utilizing approximately 180 μm to 200 μm thick uninsulated CNT fibers spaced between approximately 1.2 millimeters ("mm") to 2.0 mm apart.

In this example, the DMS includes a fabric-material having a top-surface where a portion of the top-surface (also herein referred to as a "shield" having a "shield area" associated with the portion of the top-surface) includes a series (i.e., a plurality) of approximately parallel or slightly divergent (for example with a divergence of approximately 15 to 20 degrees) conductive-fibers through which an AC voltage-signal of high voltage (for example, approximately 800V to 1,200V at a frequency between approximately 5 to 100 Hertz) is applied resulting in the generation of a traveling-wave of electric-field along the shield.

Each conductive-fiber of the plurality of conductive-fibers may be positioned approximately parallel or slightly divergent to adjacent conductive-fibers. Additionally, the surface of the fabric material may be partitioned into different sections, where each section of the fabric-material may be configured to have different conductive-fiber patterns that are not parallel to other sections of the shield. For example, the shield may include sections that are at angles up to approximately 90 degrees from other sections of the shield. The position and spacing of the plurality of conductive-fibers depends upon the application and enables re-configurability of the traveling-wave of the electric-field along the shield. In this example, the resulting traveling-wave of the electric-field repels the dust particles on the shield and the repelled dust particles travel in a direction that is along or against the direction of the travelling-wave, depending on the dielectric properties of the dust particles and the charges (and induced charges) on the dust particles. This approach also prevents further accumulation of dust particles on the shield and removes most charged dust particles from the shield. In general, the conductive-fibers may either be excited by utilizing single-phase or multi-phase AC voltage-signals.

In general, the DMS may be configured to operate in multiple ways that include, for example, an initial configuration of the DMS at fabrication and/or a reconfiguration of the DMS after the activation of the DMS during operation. Specifically, as an example, when fabricating the DMS on a device (such as, for example, a spacesuit, space habitat, inflatable structures, fabric-based antenna, blanket, flexible material devices, or other similar systems, devices, or components), the orientation of the conductive-fibers may be designed and configured to allow for various contours, flexibility, or both of the fabric-material in which the DMS is implemented so as to optimize the dust repelling properties of the DMS. Additionally, the type of fabric-material may be chosen to have electrical and mechanical properties that optimize the operation of the DMS. As an example, the configuration of both the placement and geometric alignment of the conductive-fibers within the fabric-material and the optimization of the surface properties of the fabric or flexible material are directly related to the physical robustness and dust repelling (i.e., dust mitigation) performance of the DMS.

Additionally, as a reconfiguration during operation example, the DMS may include feedback controlled electronics (described later in relation to FIGS. 16 to 18), electromechanical devices, or both within (or associated with) the fabric-material or flexible-material that receive inputs from sensors associated with or within the shield area of either the fabric-material or flexible-material. Examples of the sensors may include optical or capacitive sensors that may be located on, or within, the shield area of the fabric-material or flexible-material or somewhere remote from the shield area but associated with the fabric-material or flexible-material shield area. As such, these sensors may be local sensors within the shield area embedded within the fabric-material or flexible-material, the conductive-fibers themselves, or both. Additionally, the sensors may be remote sensors that are located remote from the shield areas such as, for example, sensors located at different areas of a spacesuit or other devices or systems associated with the DMS at the shield area. As a further example, some of these sensors may be completely remote from the shield areas such as sensors on a weather satellite (or satellites) that provide dust data to the DMS for adjusting the operation of the DMS to better optimize dust mitigation on the shield.

In all of these sensor examples, the sensors provide sensor output signals (which are information signals having sensor data information that was produced by the individual sensors) to a DMS controller of the DMS. The DMS controller is configured to vary the waveforms and frequencies of the AC voltage-signals provided to the conductive-fibers based on the received sensor output signals so as to optimize the dust mitigation properties of the DMS. The DMS controller may be in signal communication with the input-signal-source and capable of fixing or adjusting the individual AC voltage-signals produced by the input-signal-source in voltage, frequency, and phase in response to the received sensor output signals. In this example, the DMS controller may be any general electronic controller that may include a micro-controller, a central processing unit ("CPU") based processor, digital signal processor ("DSP"), an application specific integrated circuit ("ASIC"), field-programmable gate array ("FPGA"), or other similar device or system.

In addition to sensors, the DMS may also include a plurality of actuators that may be located on the back-surface of the fabric-material or flexible material below the shield area. These actuators may be electromechanical devices capable of moving, shaking, vibrating, or performing other types of mechanical work that assists in dislodging, moving, and repelling dust particles on the shield. The actuators are in signal communication with the DMS controller and the DMS controller is also configured to control the operation of the actuators based on the received sensor output signals so as to optimize the dust mitigation properties of the DMS at the shield. Utilizing the sensors, actuators, or both, the DMS controller is configured to adjust the AC voltage-signals from input-signal-source to optimize the dust mitigation of the DMS based on the properties of the fabric-material or flexible-material (e.g., the layers, coatings, dielectric properties, etc.) and the dust (e.g., the size, mass, dielectric proprieties, distribution, etc.). As such, the DMS controller is configured to vary the AC voltage-signals to adjust the mode of operation of the DMS.

As an example in a first mode of operation (i.e., a dynamic dust movement mode), a first optimized AC voltage-signal having a first waveform and first frequency value may be utilized by the DMS to repel dust before the dust settles on the shield of the fabric-material. Alternatively, as an example of a second mode of operation where static dust has settled (i.e., shield is predisposed to dust prior to activation of DMS) on the shield of the fabric-material, a second optimized AC voltage-signal having a second waveform and second frequency value may be utilized by the DMS to repel dust that has settled on the shield of fabric-material.

For example, if the DMS is active prior to the dust settling on the shield, about 90 percent or more of the dust is repelled utilizing a lower voltage AC voltage-signal (e.g., approximately 800V to 900V), while alternatively if the dust has already settled on the shield prior to activating the DMS, the DMS will need to utilize a higher voltage AC voltage-signal (e.g., approximately 1,000V to 1,200V) to repel the dust from the shield. Additionally, once the dust has settled on the shield, the DMS may need to utilize AC voltage-signals with higher spectral bandwidths that may be up to approximately 200 Hz to dislodge the settled dust from the shield. In these examples, the DMS controller may utilize a lookup database on a storage unit (i.e., a memory unit or module) to determine the type of AC voltage-signal (i.e., the type of signal waveform, frequency, voltage, phase, etc.) to utilize or adjust in the DMS to dislodge, repel, or both, the dust that is settling or settled on the shield based on input data from sensors that may provide the status of dust contamination on the shield. The lookup database may include values based on the sensors or other sources that are in signal communication with the DMS. The storage unit may be part of the DMS or remote but in signal communication with the DMS. As an example, the location of the driving and control electronics that generate the AC voltage-signals (such as, for example, the input-signal source) that are passed to the conductive-fibers within the fabric-material may be locally embedded in the fabric-material, centrally located and/or remote from the DMS, or co-located with the DMS and the rest of the device that the DMS is implemented on such as, for example, the systems and electronics of a spacesuit.

Figure 3A:
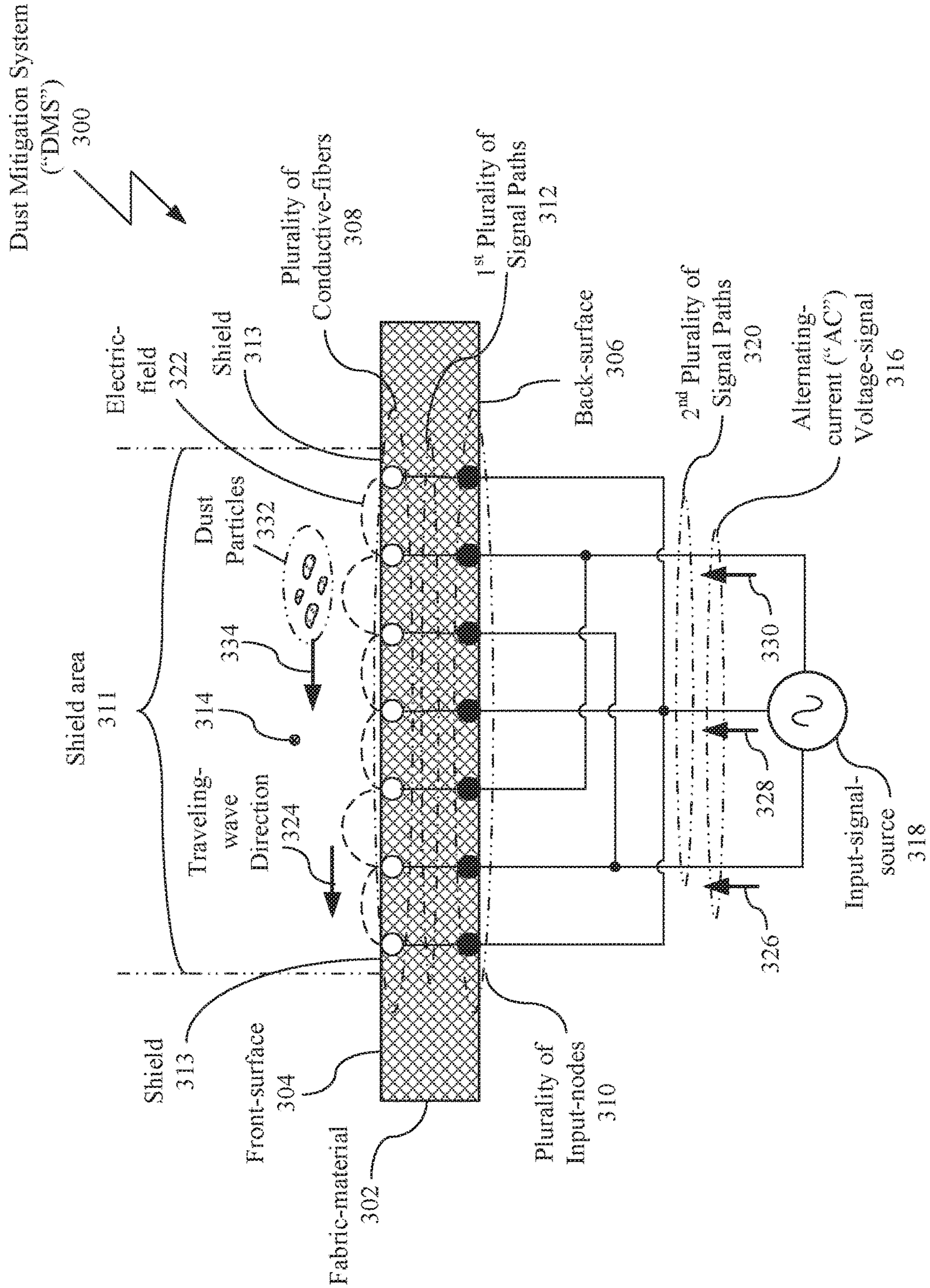
FIG. 3A is side-view of a system block diagram of an example of an implementation of a Dust Mitigation System ("DSM") in accordance with the present disclosure.

In FIG. 3A, a side-view of a system block diagram is shown of an example of an implementation of a DMS 300 in accordance with the present disclosure. The DMS 300 includes a fabric-material 302 having a front-surface 304 and back-surface 306, a plurality of conductive-fibers 308 within the fabric-material 302, and a plurality of input-nodes 310 on the back-surface 306 of the fabric-material 302 in signal communication with the plurality of conductive-fibers 308 via a first plurality of signal paths 312 within the fabric-material 302.

The plurality of conductive-fibers 308 are configured as a series (i.e., a plurality) of approximately parallel conductive-fibers 308 along the fabric-material 302 approximately adjacent to (i.e., either on or close to) the front-surface 304 and the plurality of input-nodes 310 are configured as a series of input-nodes that are approximately adjacent to the back-surface 306 of the fabric-material 302 where each input-node from the plurality of input-nodes is in signal communication with a corresponding conductive-fiber from the plurality of conductive-fibers 308 via an corresponding signal path of the first plurality of signal paths 312. The plurality of conductive-fibers 308 are located within a shield area 311 that is a portion of the front-surface 304 (also referred to as the top-surface of the fabric-material 302) defining the shield 313 of the DMS 300.

In this example, the plurality of conductive-fibers 308 are shown as approximately parallel and oriented in first direction 314 along the shield 313 of the fabric-material 302 (within the shield area 311) that is either into or out of the page in the side-view of FIG. 3A. For the purposes of illustration, the first direction 314 is shown as being into the page, however, it is appreciated by those of ordinary skill in the art that the first direction 314 may alternatively be in the opposite direction out of the page without limiting the present disclosure. If the plurality of conductive-fibers 308 are not parallel, the plurality of conductive-fibers 308 may be slightly divergent such as, for example, the plurality of conductive-fibers 308 may be divergent with approximately 15 to 20 degrees of deviation from parallel.

In this example, the plurality of conductive-fibers 308 are woven, or braided, into the front-surface 304 of the fabric-material 302 (where the fabric-material 302 may be, for example, a woven (or braided) fabric-material, flexible-material, or both) at the shield 313. Additionally, each conductive-fiber of the plurality of conductive-fibers 308 may be a carbon-nanotube ("CNT") fiber. Moreover, each input-node of the plurality of input-nodes 310 may be an electrode. Furthermore, each conductive-fiber of the plurality of conductive-fibers 308 may also be an electrode.

In this example, the plurality of conductive-fibers 308 are configured to receive an AC voltage-signal 316 from an input-signal-source 318 (via a second plurality of signal paths 320, the plurality of input-nodes 310, and the first plurality of signal paths 312), where the input-signal-source 318 is in signal communication with the plurality of input-nodes 310 via the second plurality of signal paths 320. In an example of operation, once the plurality of conductive-fibers 308 receive the AC voltage-signal 316, each conductive-fiber of the plurality of conductive-fibers 308 is electrically energized and acts as an electrical radiating-element along (or approximately adjacent to) the front-surface 304 of the fabric-material 302 resulting in an electric-field 322 along the front-surface 304 of the fabric-material 302. The electric-field 322 generates a traveling-wave along the front-surface 304 of the fabric-material 302 in a second direction 324 that is transverse to the first direction 314. It is appreciated that the second direction 324 may optionally be from left-to-right or from right-to-left based on the characteristics of the electric-field 322 or at a preset angle to the traverse.

Figure 3B:
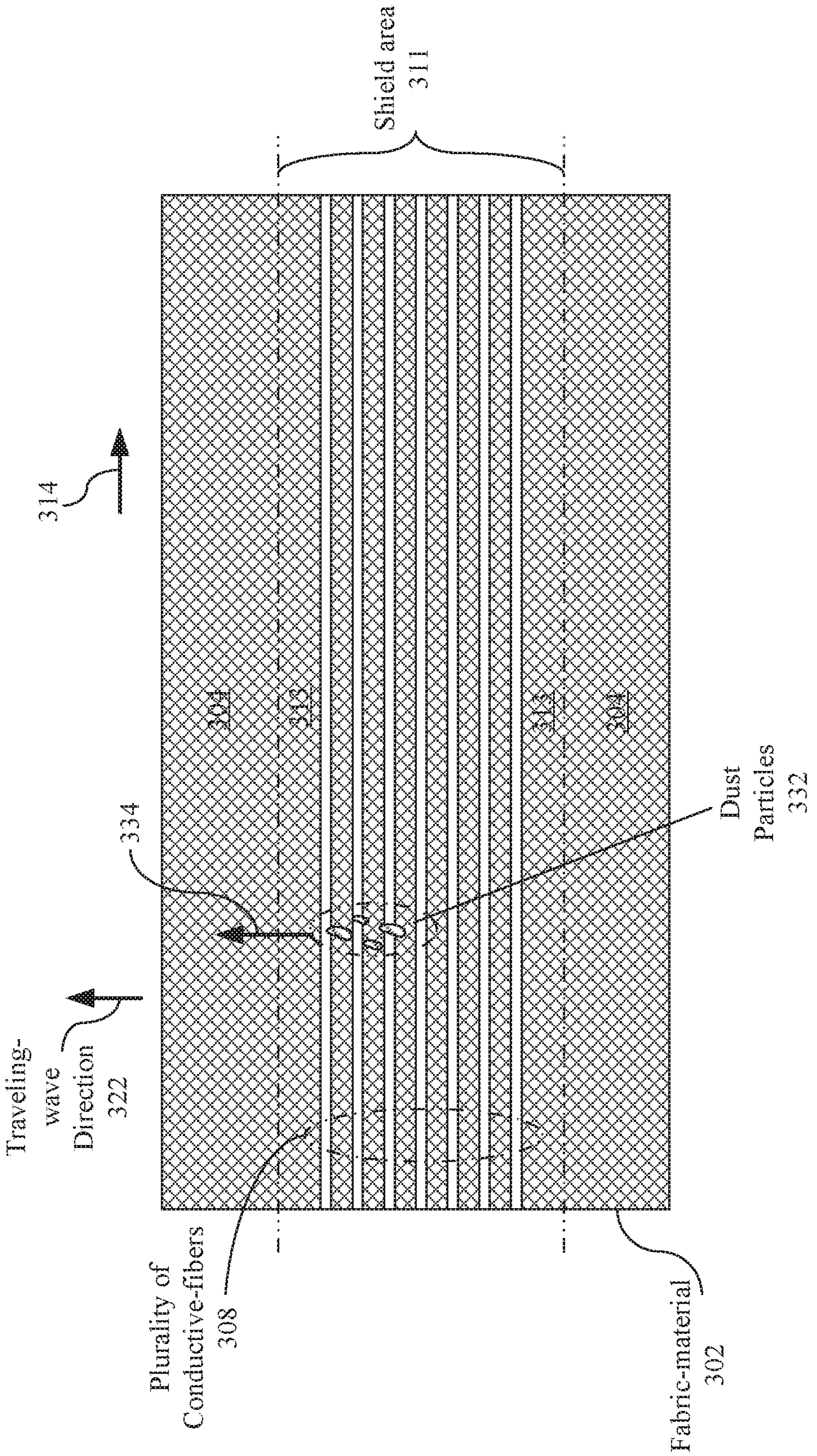
FIG. 3B is a top-view of a system block diagram of the implementation of the DMS (shown in FIG. 3A) in accordance with the present disclosure.

In this example, the input-signal-source 318 may be a three-phase power supply signal-source that produces the AC voltage-signal 316 as a three-phase AC voltage-signal 316 having a plurality of AC phased-signals that include a first-phase signal 326, second-phase signal 328, and third-phase signal 330. It is appreciated by those of ordinary skill in the art that instead of the input-signal-source 318 being a three-phase input-signal-source 318 producing a three-phase AC voltage-signal 316, other multi-phase input-signal-sources may be utilized such, for example, a two-phase or four phase input-signal-source producing a two-phase or four phase AC voltage-signal respectively may also be utilized. Once the AC voltage three-phase signals 326, 328, and 330 are applied to the DMS 300, any dust particles 332 on the front-surface 304 of the fabric-material 302 are repelled and moved off the front-surface 304 for the fabric-material 302 in a repulsion direction 334 that is parallel to the first direction 314. Turning to FIG. 3B, a top-view of a system block diagram is shown of the implementation of the DMS 300 (shown in FIG. 3A) in accordance with the present disclosure.

It is noted that while the plurality of input-nodes 310 are shown approximately adjacent to the back-surface 306, this is for the purpose of illustration because the plurality of input-nodes 310 may be located in varying positions adjacent to the fabric-material 302. As an example, the plurality of input-nodes 310 may be located on the back-surface, within the fabric-material 302 adjacent but just below the back-surface 306, on the front-surface 304, within the fabric-material 302 adjacent but just below the below the front-surface 304, at a side (not shown) of the fabric-material, within the fabric-material with an access via to either the front-surface 304 or back-surface 306, or any place adjacent the fabric-material that does not result in unacceptable interference with the generated electric-field 322 when the plurality of conductive-fibers 308 are feed with the AC voltage-signal 316, since the AC voltage-signal 316 will induce an electromagnetic fields from the plurality of input nodes 310 and the first plurality of signal paths 312 that if too close to the plurality of conductive-fibers 308 may interact and/or interfere with the induced currents produced by the AC voltage-signal 316 on the plurality of conductive-fibers 308 and/or the resulting electric-field 322.

The circuits, components, modules, and/or devices of, or associated with, the DMS 300 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

In this example, the plurality of conductive-fibers 308 are a plurality of CNT-fibers that are utilized as electrodes within the fabric-material 302 because they are good electrical conductors and are mechanically strong and flexible (i.e., they have high resilience to fatigue) when compared to traditional metal electrodes. It is appreciated by those of ordinary skill in the art that CNT-fibers are a high performance technology breakthrough material with applications in nanotechnology, electronics, material science, optics, etc. Generally, CNT-fibers are multifunctional materials that combine the best properties of polymers, carbon fibers, and metals because CNT-fibers have exceptional properties of mechanical strength and stiffness, electrical and thermal conductivity, and low density (e.g., approximately 1 $g/cm^3$ for a CNT-fiber compared to about 8.96 $g/cm^3$ for copper) that exist on the molecular level. Specifically, CNT-fibers are allotropes of carbon with a cylindrical nanostructure that have a cylindrical structure with a diameter of about one nanometer ("nm" equal to $10^{-9}$), a length-to-diameter ratio up to about 132,000,000 to 1, high thermal conductivity (with a range of approximately 100 $mWm^2/kgK$ to 1000 $mWm^2/kgK$), normalized electrical conductivity (with a range of approximately 1 kS $m^2/kg$ to 6 kS $m^2/kg$, normalized by density), and high mechanical strength and stiffness (with a tensile strength in the approximate range of 1 GPa to 1.3 GPa).

At present, lightweight CNT-fibers may be produced with lengths that are on the orders of meters while having properties approaching the high specific strength of polymeric and carbon-fibers, high specific electrical conductivity of metals, and specific thermal conductivity of graphite-fibers as shown recently by academic sources. These CNT-fibers are high-strength fibers with relatively low-conductivity (e.g., about 1.1 MS/m for a CNT-fiber) when compared to high-conductivity metals (e.g., about 49 MS/m for off the shelf copper magnet wire) that have relatively low-strength such as, for example, copper. However, while the electrical conductivity for these CNT-fibers might be lower than copper and other known highly conductive materials, the advantage of CNT-fibers is their low-density that makes the current carrying capacity ("CCC"), when normalized by mass, much higher than the metal conductors.

As a result of these properties, in the present example, CNT-fibers have been utilized as the plurality of conductive-fibers 308 of the DMS 300 because the CNT-fibers overcome the challenges of integrating the DMS 300 with metal wires or strips as electrodes instead of the conductive-fibers

308. Specifically, the mechanical properties of CNT-fibers are higher than the mechanical properties of the high-conducting metallic-materials and the mass of a CNT-fiber is low compared to a metal electrode. Therefore, even if the CNT-fiber thickness needs to be increased to match the low-resistance of a metal electrode, the overall mass contribution of the CNT-fiber is less than that of the metal electrode. It is appreciated that while the CNT-fibers are utilized in this example, other fibers such as Litewire may be also utilized, in other applications, as long as the other fibers have high-strength with high-resilience to fatigue, high-conductivity on par with metallic-materials, and that the mass of the other fibers are low when compared to metal-electrodes.

As such, the utilization of CNT-fibers for the plurality of conductive-fibers 308 within the fabric-material 302 are preferred because the fabric-material 302 is flexible and in the case of spacesuit fabrics, flexible and complex to fabricate. Specifically, the use of metallic-materials (such as, for example, copper or indium tin oxide) within the fabric-material 302 of a spacesuit would be difficult because the metallic-materials are challenged by fatigue breakage and often exhibit high cycle fatigue resulting in failure of the metallic-materials due to cyclic loading under repeated loads. Unfortunately, spacesuits, as an example, undergo repeated motions that flex, bend, fold, or twist spacesuit materials (e.g., fabric-materials and other such flexible-materials) specifically within the leg or arm potions of the spacesuit. As such, spacesuit-materials need to be highly flexible and nearly fatigue-free. Additionally, fabricating a spacesuit with these metallic-materials is also challenging because the spacesuits have irregular contours and non-smooth surfaces. As a result, with spacesuit fabric-materials, it is not possible to adhere metallic-material wires to the fabric-material surfaces of a spacesuit utilizing known techniques such as, for example, sputtering or ink-jet printing. Additionally, spacesuit fabric-materials (e.g., beta cloth, ortho-fabric, or both, or other examples of suitable fabric-materials or flexible-materials, such as used in BIOSUIT® or flexible materials used for space habitats, inflatable structures, flexible deployable antennas and combinations thereof) that are exposed to dust are generally coated with polytertraflouroethylene ("PTFE" a synthetic fluoropolymer of tetrafluorethylene generally known as "TEFLON®") that is not conducive to directly bonding any electrodes to the surface of spacesuit materials. However, it is noted that for other fabric-materials in which bonding is suitable, the electrodes may be bonded without departing from the spirit of the present disclosure.

It is appreciated that beta-cloth is a type of fireproof silica fiber cloth used in the manufacture of spacesuits such as the Apollo/Skylab A7L spacesuits and the Apollo thermal micrometeroid garment. In general, beta-cloth includes fine woven silica fiber that is similar to fiberglass and is a fabric-material that is coated with PTFE and will not burn and will only melt at temperatures exceeding 650° C. Ortho-fabric is utilized for the outer layer of the spacesuit and includes a complex weave blend of GORE-TEX® (i.e., a synthetic waterproof fabric-material that includes a membrane that is permeable to air and water vapor), KEVLAR® (i.e., poly-paraphenylene terephthalamide, a para-aramid synthetic fiber of high tensile strength), and NOMEX® (a flame-resistant meta-aramid synthetic fiber) materials.

Figure 4:
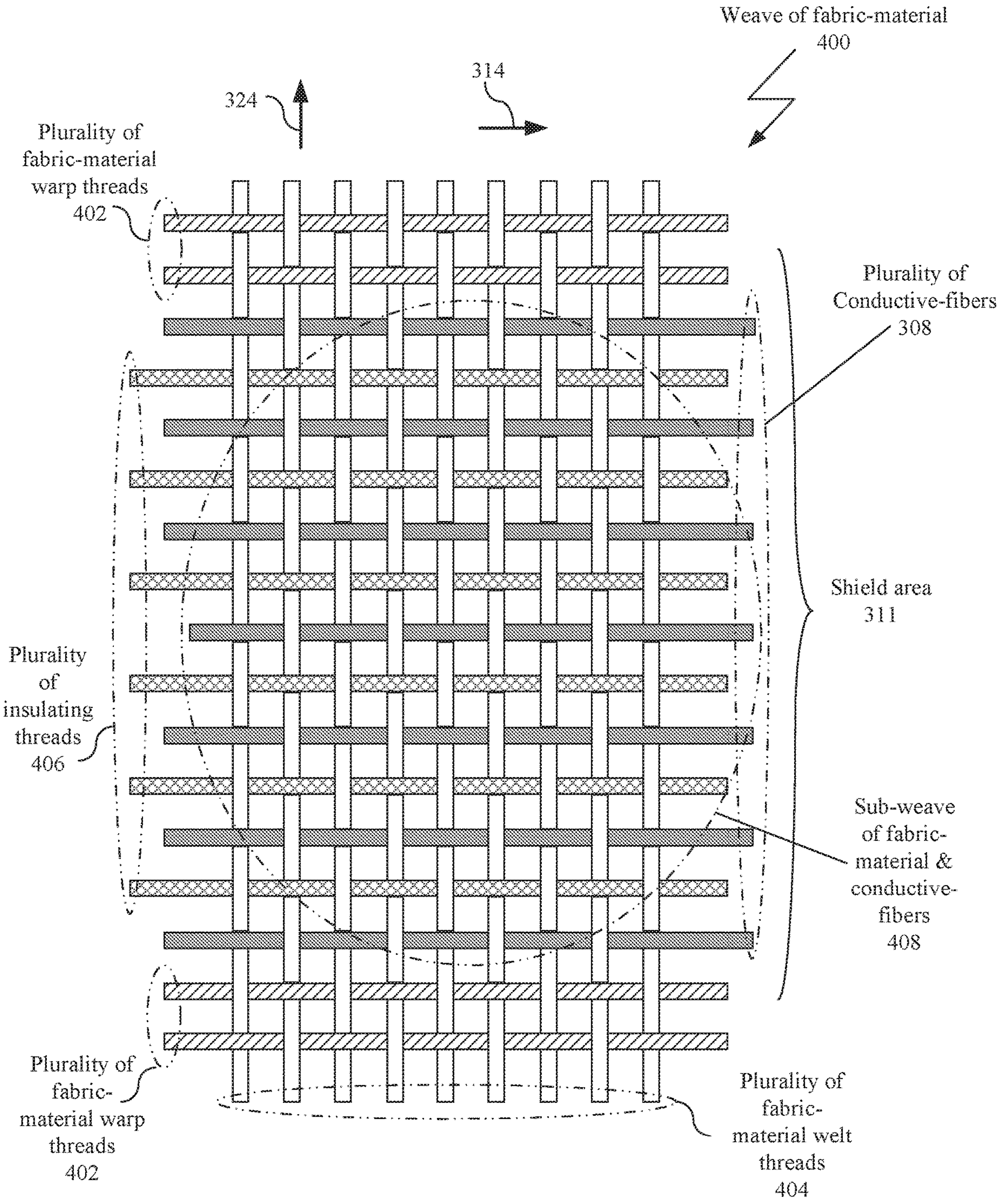
FIG. 4 is a top-view of an implementation of a weave of the fabric-material with the plurality of conductive-fibers (shown in FIGS. 3A and 3B) in accordance with the present disclosure.

Turning to FIG. 4, a top-view of an implementation of a weave 400 of the fabric-material 302 with the plurality of conductive-fibers 308 (shown in FIGS. 3A and 3B) is shown in accordance with the present disclosure. Similar to the examples shown in FIGS. 3A and 3B, seven (7) conductive-fibers 308 are shown within the shield area 311 of the fabric-material 302, however, it is appreciated by of ordinary skill in the art that any plurality of conductive-fibers 308 may be utilized based on the desired repulsive properties of the shield 313.

In this example, the conductive-fibers 308 are CNT-fibers that are weaved into the fabric-material 302. Moreover in this example, the weave 400 of the fabric-material 302 is shown having a plurality of fabric-material 302 warp threads 402 (i.e., a plurality of fabric-material 302 horizontal threads) and plurality of fabric-material 302 welt threads 404 (i.e., a plurality of fabric-material 302 vertical threads) forming the front-surface 304 of the fabric-material 302 and a plurality of insulating threads 406 adjacent to and in-between the plurality of conductive-fibers 308. In this example, the plurality of fabric-material 302 warp threads 402, plurality of insulating threads 406, and plurality of conductive-fibers 308 run along the first direction 314 of the weave 400 while the plurality of fabric-material 302 welt threads 404 run along the second direction 324 of the weave 400. In this example, the fabric-material 302 may be an ortho-fabric-material and the plurality of fabric-material 302 warp threads 402 and plurality of fabric-material 302 welt threads 404 are threads (i.e., a yarn or textile fibers) of the ortho-fabric-material generally two-plied (i.e., two threads of material twisted together ("plied") to for a "2-ply" thread) or multi-ply (i.e., more than 2-ply) textile fibers utilized to produce the weave 400 of fabric-material 302. It is appreciated by those of ordinary skill in the art that the fabric material 302 is generally at least 2-plyed to increase the strength of the fabric-material 302. Additionally, the plurality of insulating threads 406 may also be of the same ortho-fabric-material as the plurality of fabric-material 302 warp threads 402 and plurality of fabric-material 302 welt threads 404 as long as the ortho-fabric-material is capable of electrically insulating each conductive-fiber of the plurality of conductive-fibers 308 from each other. Furthermore, each conductive-fiber of the plurality of conductive-fibers 308 may also be 2-plyed or multi-plied conductive-fibers. As such, in this example, the fabric-material 302 is shown as a sub-weave 408 of the weave 400 of the fabric-material 302. The sub-weave 408 includes the plurality of conductive-fibers 308 (as a plurality of warp conductive-fibers) along the plurality of fabric-material 302 welt threads 404 and in between the plurality of fabric-material 302 warp threads 402, where the sub-weave 408 includes the plurality of insulating threads 406 spaced in-between the plurality of conductive-fibers 308.

In this example the plurality of conductive-fibers 308 and plurality of insulating threads 406 are shown as extending uniformly in one direction (i.e., first direction 314), however, it is noted that the plurality of conductive-fibers 308 and plurality of insulating threads 406 may be intermixed in both warp and weft in any ordering or pattern desired based on the design of the DMS 300 as will be shown later in this disclosure. It is further noted that the plurality of insulating threads 406 may have a dielectric constant value or values that do not significantly diminish the traveling-wave of the electric-field 322 produced by the DMS 300. While the weave 400 of fabric-material 302 is shown in this example, it is noted that the fabric-material 302 may instead be braided.

Figure 5A:
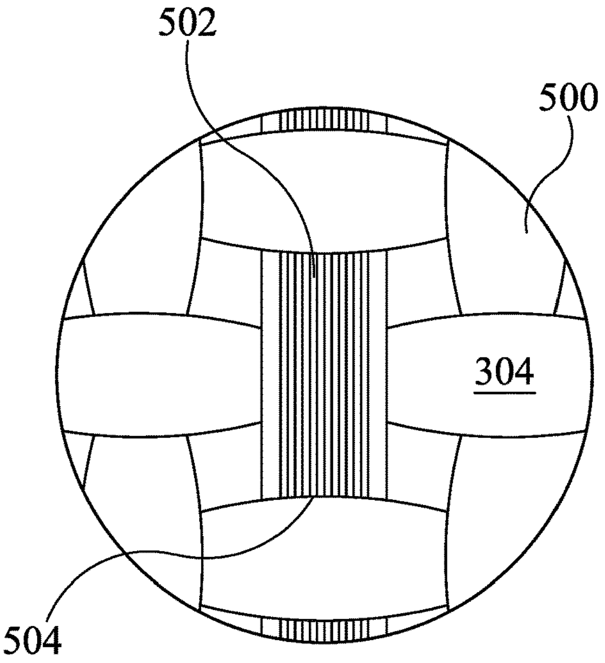
FIG. 5A is an amplified front-view of an example of an implementation of the weave shown in FIG. 4 for an ortho-fabric-material with a plurality of conductive-fibers in accordance with the present invention.
Figure 5B:
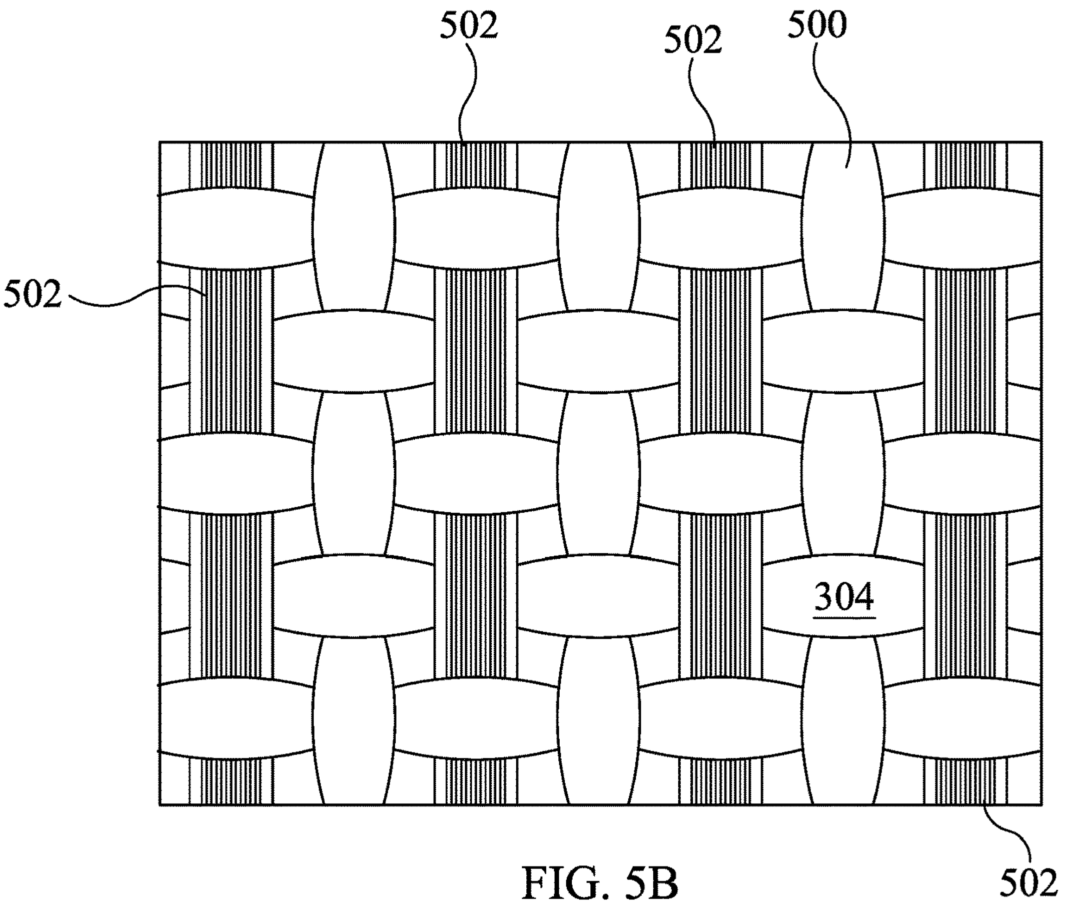
FIG. 5B is a less amplified front-view of the weave shown in FIG. 5A for the ortho-fabric-material with the plurality of conductive-fibers in accordance with the present invention.
Figure 5C:
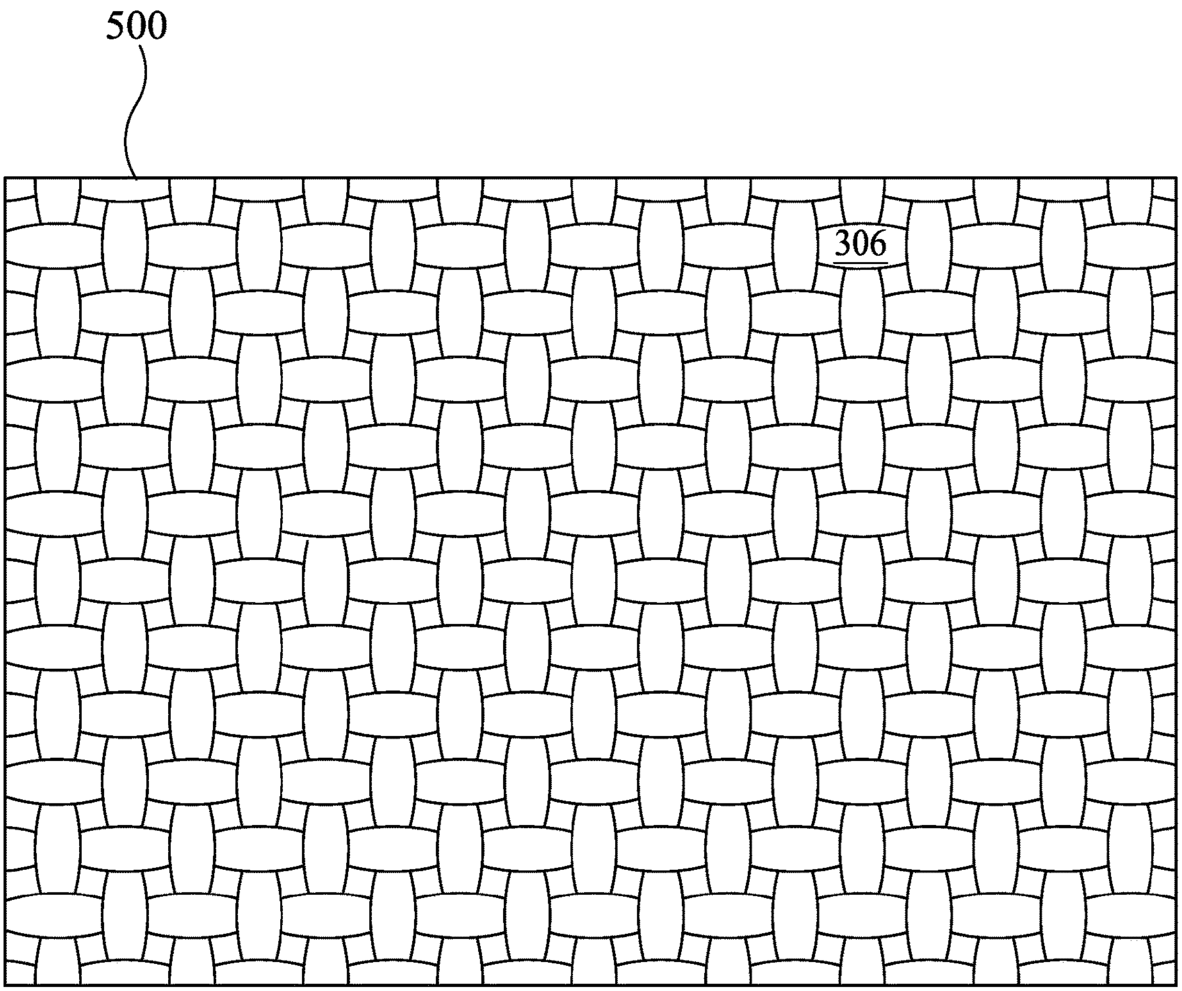
FIG. 5C is a back-view of the weave shown in FIGS. 5A and 5B in accordance with the present disclosure.

Turning to FIGS. 5A, 5B, and 5C, front and back view is shown of an example of an implementation of a weave, or braid, of the fabric-material 302 as an ortho-fabric-material 500 (e.g., the outer-layer material of the spacesuit) with a plurality of CNT-fibers 502 utilized as the plurality of conductive-fibers 308 in accordance with the present disclosure. In FIGS. 5A and 5B, the front-surface 304 (also referred to herein as the "top-side") of the ortho-fabric-material 500 is shown while in FIG. 5C, the back-surface 306 of the ortho-fabric-material 500 is shown. FIG. 5A is an amplified front-view of the front-surface 304 of the ortho-fabric-material 500 showing a single CNT-fiber 504 (of the plurality of CNT-fibers 502) woven, or braided, into the threads (i.e., fibers) of the ortho-fabric-material 500, while FIG. 5B shows a less amplified front-view of the front-surface 304 of the ortho-fabric-material 500 showing multiple CNT-fibers (of the plurality of CNT-fibers 502) woven, or braided, into the threads of the ortho-fabric-material 500. In this example, the plurality of CNT-fibers 502 do not penetrate the entire fabric-material 302 thickness of the ortho-fabric-material 500. The weave, or braid, is done such that only the front-surface 304 has the plurality of CNT-fibers 502. As such, in FIG. 5C, the ortho-fabric-material 500 is shown not to have any CNT-fibers 502 passing through the back-surface 306 of the ortho-fabric-material 500.

Figure 6:
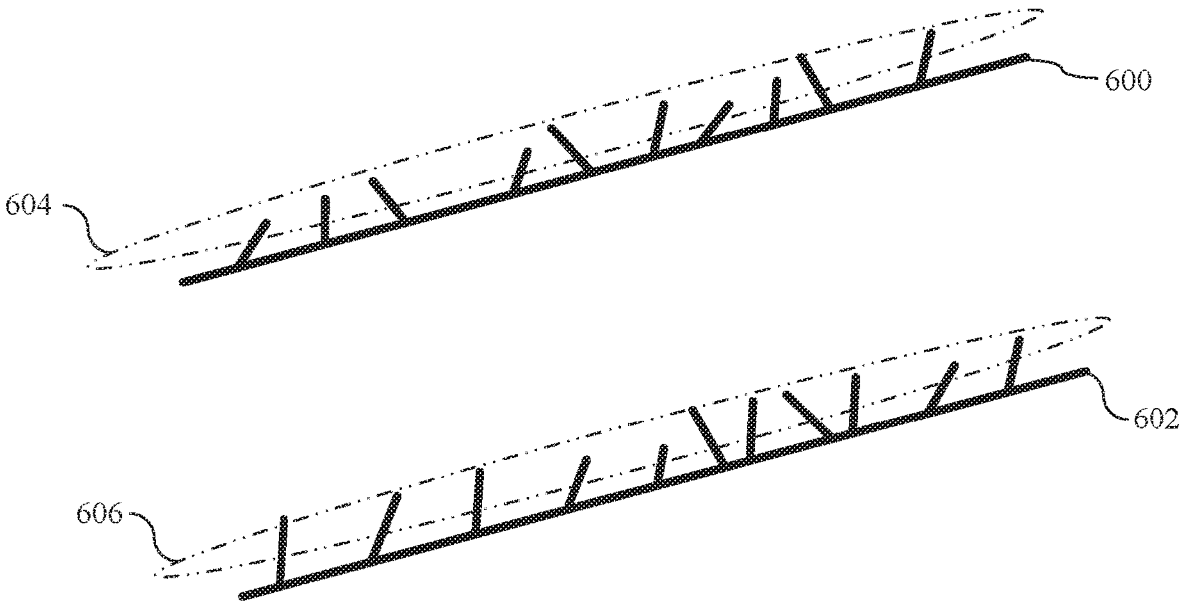
FIG. 6 is an angled side-view of an example of an implementation of a portion of two conductive-fibers in accordance with the present disclosure.

In FIG. 6, an angled side-view of an example of an implementation of a portion of two CNT-fibers 600 and 602 is shown in accordance with the present disclosure. The two CNT-fibers 600 and 602 (of the plurality of CNT-fibers 502, FIGS. 5A-5C) may include side fibrils 604 and 606 (i.e., generally known as "hairs" of the CNT-fiber) that are formed by slightly frayed strands in the CNT-fibers 600 and 602, which may be oriented in an organized or random fashion. In generally, the utilization of the side-fibrils 604 and 606 increases the dust repellant effect of the DMS 300 by creating irregularities in the electric-field 322, FIG. 3A.

Figure 7A:
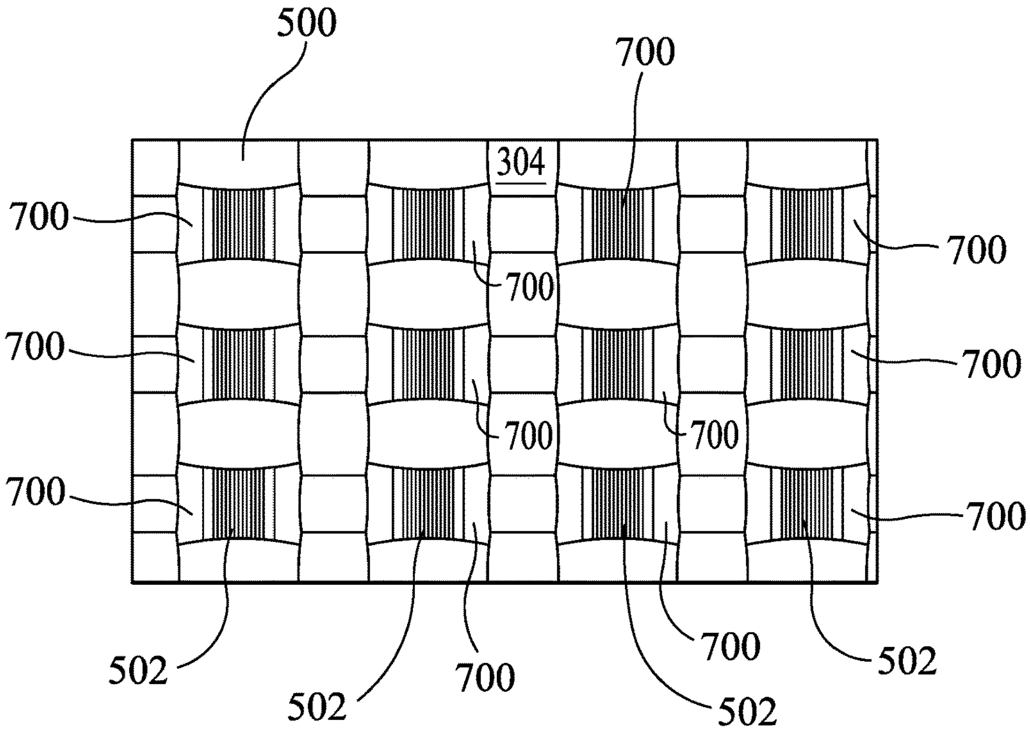
FIG. 7A is an amplified front-view of an example of an implementation of the insulation of the plurality of conductive-fibers on the front-surface of the fabric-material in accordance with the present disclosure.
Figure 7B:
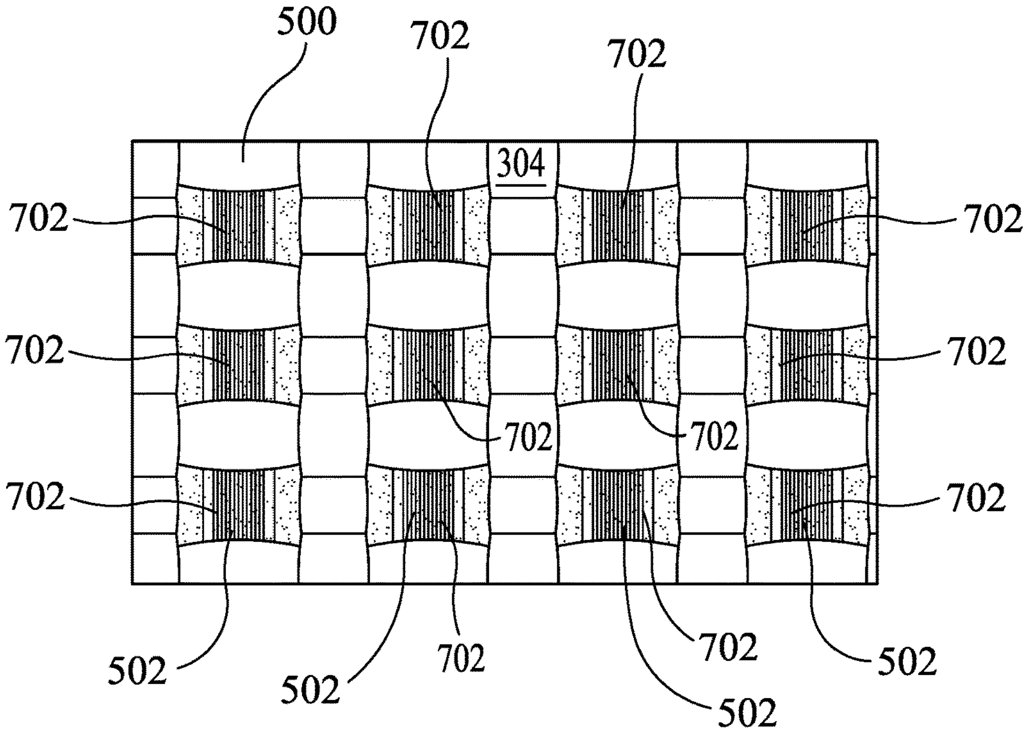
FIG. 7B is an amplified front-view of an example of an implementation of an insulating layer on the front-surface (shown in FIG. 7A) of the fabric-material in accordance with the present disclosure.
Figure 7C:
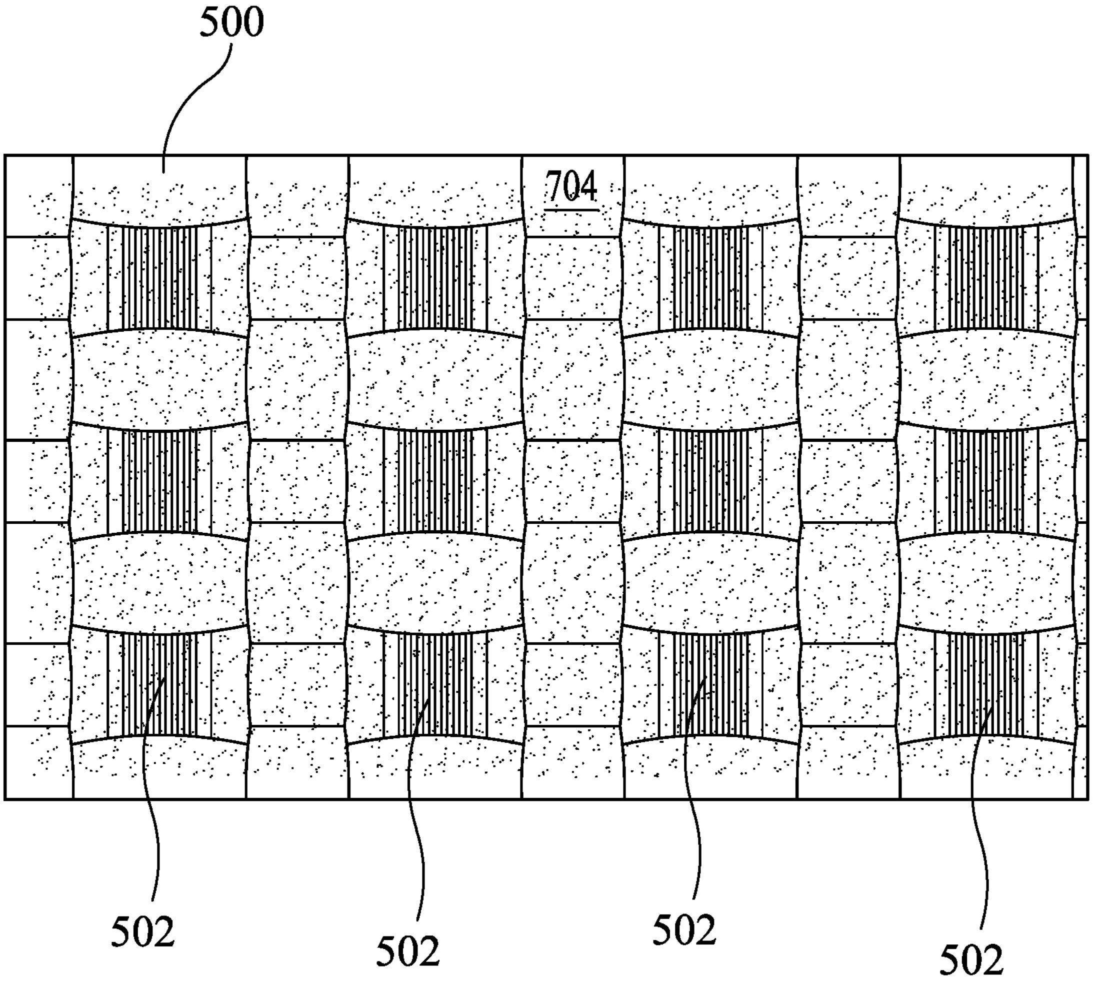
FIG. 7C is an amplified front-view of an example of an implementation of a top-layer coating on the front-surface (shown in FIGS. 7A and 7B) of the fabric-material in accordance with the present disclosure.

In FIGS. 7A, 7B, and 7C, front-views of an example of an implementation of the insulation of the plurality of CNT-fibers 502 (shown in FIGS. 5A, 5B, and 5C) on the front-surface 304 of the ortho-fabric-material 500 are shown in accordance with the present disclosure. In this example, a plurality of thermoplastic-fibers 700 are mounted during the fabrication of the ortho-fabric-material 500. In this example, the assembled ortho-fabric-material 500 and the plurality of thermoplastic-fibers 700 are annealed at elevated temperatures, melting the thermoplastic-fibers 700 to create a micron-sized insulating layer 702 that increase the safety of the combination of ortho-fabric-material 500 and the plurality of CNT-fibers 502 while only having minimal reduction in the electric-field 322 (for example, less than approximately 10% reduction) that repeals the dust particles 332. In FIG. 7C, a top-layer coating 704 is shown completely covering the front-surface 304 of the ortho-fabric-material 500 and plurality of CNT-fibers 502. The top-layer coating 704 may be electrically insulating or polarizing for local enhancement of the electric-field 322. The top-layer coating 704 may be applied after the assembly of the plurality of CNT-fibers 502 and the front-surface 304 of the ortho-fabric-material 500 is complete. As an example, the top-layer coating 704 may be hydrophobic-material with patterning of the surface texture for maximum hydrophobicity (such as, for example, Lotus coating developed by NASA GSFC) and/or a material that bends the electronic-bands structure of the assembly (i.e., the coating plus CNT-fibers) to equalize the bandgap of the plurality of CNT-fiber 502 in the shield 313 to the typical bandgap of dust particles (as an example, the work-function developed at NASA GRC).

Figure 8:
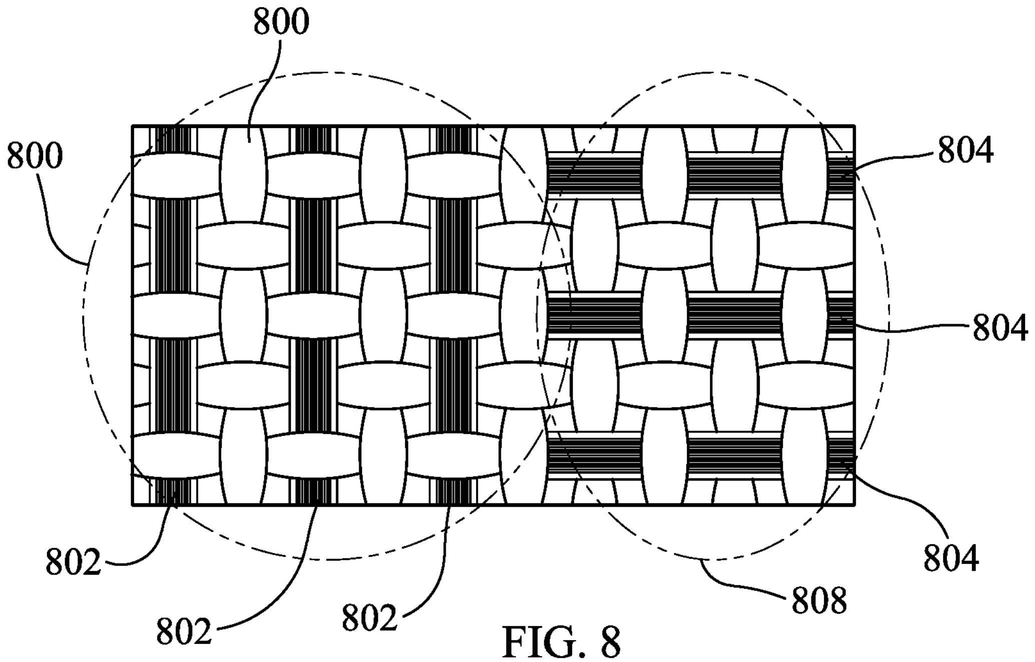
FIG. 8 is an amplified front-view of an example of another implementation of an ortho-fabric-material with a first plurality of carbon-nanotube ("CNT") fibers and second plurality of CNT-fibers in accordance with the present disclosure.

Turning to FIG. 8, an amplified front-view of an example of another implementation of an ortho-fabric-material 800 with a first plurality of CNT-fibers 802 and second plurality of CNT-fibers 804 is shown in accordance with the present disclosure. In this example, the first plurality of CNT-fibers 802 and second plurality of CNT-fibers 804 are shown to have multi-directional patterning. As an example, two areas 806 and 808 of the ortho-fabric-material 800 are shown with the first area 806 having the first plurality of CNT-fibers 802 oriented in a "vertical" direction (i.e., a vertical weave) while the second area 808 having the second plurality of CNT-fibers 804 oriented in a "horizontal" direction (i.e., horizontal weave).

Figure 9:
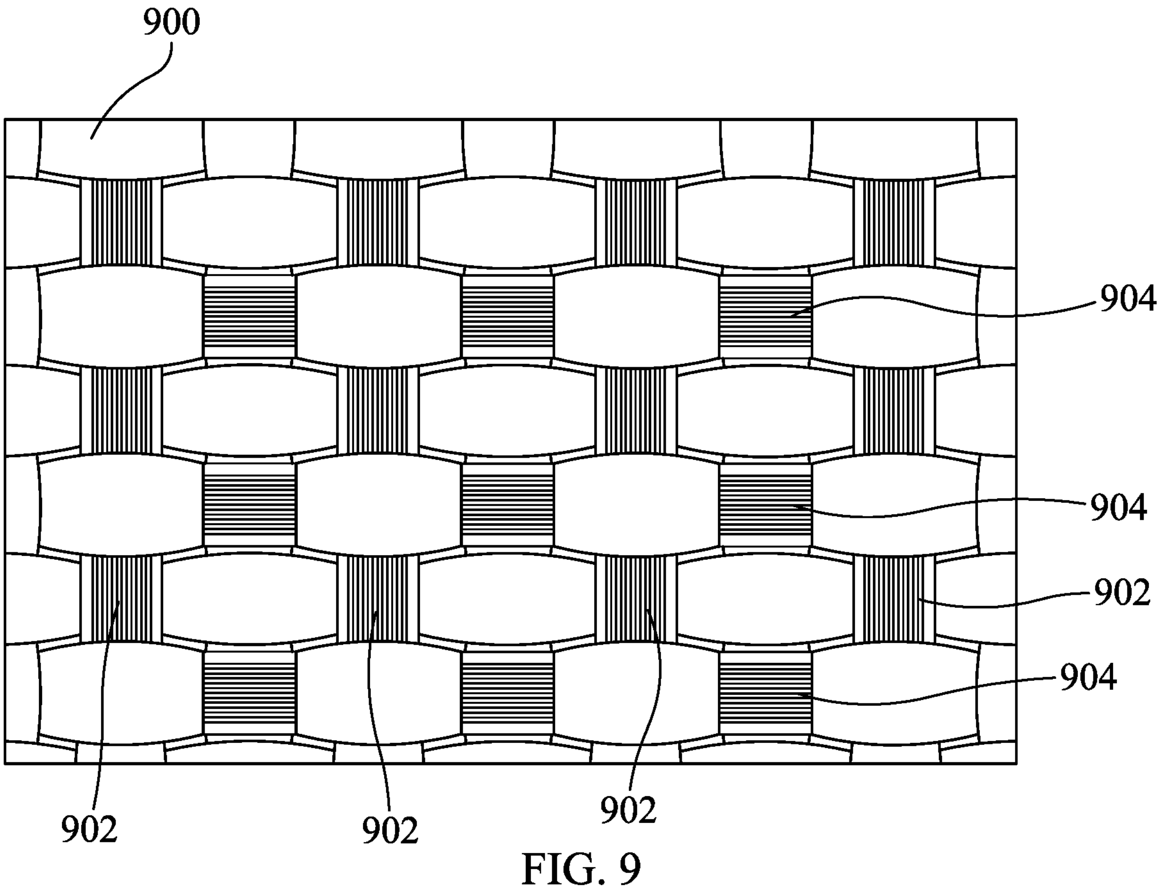
FIG. 9 is an amplified front-view of an example of yet another implementation of an ortho-fabric-material with a first plurality of CNT-fibers and second plurality of CNT-fibers in accordance with the present disclosure.

Similarly, in FIG. 9, a front-view of an example of yet another implementation of an ortho-fabric-material 900 with a first plurality of CNT-fibers 902 and second plurality of CNT-fibers 904 is shown in accordance with the present disclosure. In this example, the first plurality of CNT-fibers 902 and second plurality of CNT-fibers 904 are superimposed in a "vertical" weave and "horizontal" weave, insulated by a thin film of insulating-material or fabric-material. The superimposed weaves may be variable and/or different to enhance the electric-field 322. The individual CNT-fibers of the first plurality of CNT-fibers 902 and second plurality of CNT-fibers 904 may be insulated on either side of the individual CNT-fibers.

Figure 10:
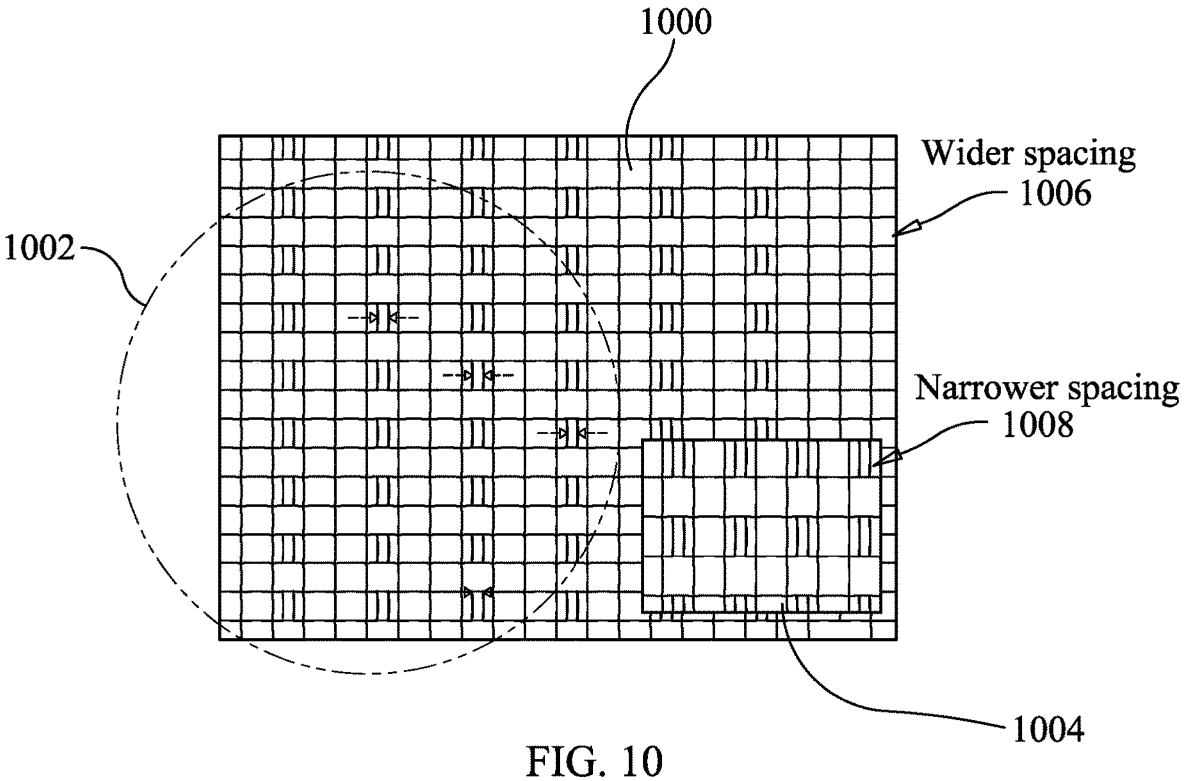
FIG. 10 is a front-view of an example of still another implementation of an ortho-fabric-material with a first plurality of CNT-fibers and second plurality of CNT-fibers in accordance with the present disclosure.

In FIG. 10, a front-view of an example of still another implementation of an ortho-fabric-material 1000 with a first plurality of CNT-fibers 1002 and second plurality of CNT-fibers 1004 is shown in accordance with the present disclosure. In this example, the first plurality of CNT-fibers 1002 and second plurality of CNT-fibers 1004 may have varying spacing and dimensions. The width (e.g., diameter) of the individual CNT-fibers of the first and second plurality of CNT-fibers 1002 and 1004 are not restricted to 90 degrees. The distance between the individual adjacent CNT-fibers of the first and second plurality of CNT-fibers 1002 and 1004 may vary. Additionally, the clustering of the first and second plurality of CNT-fibers 1002 and 1004 may vary with inter-fiber distances having a wider spacing 1006 and a narrow spacing 1008.

Figure 11:
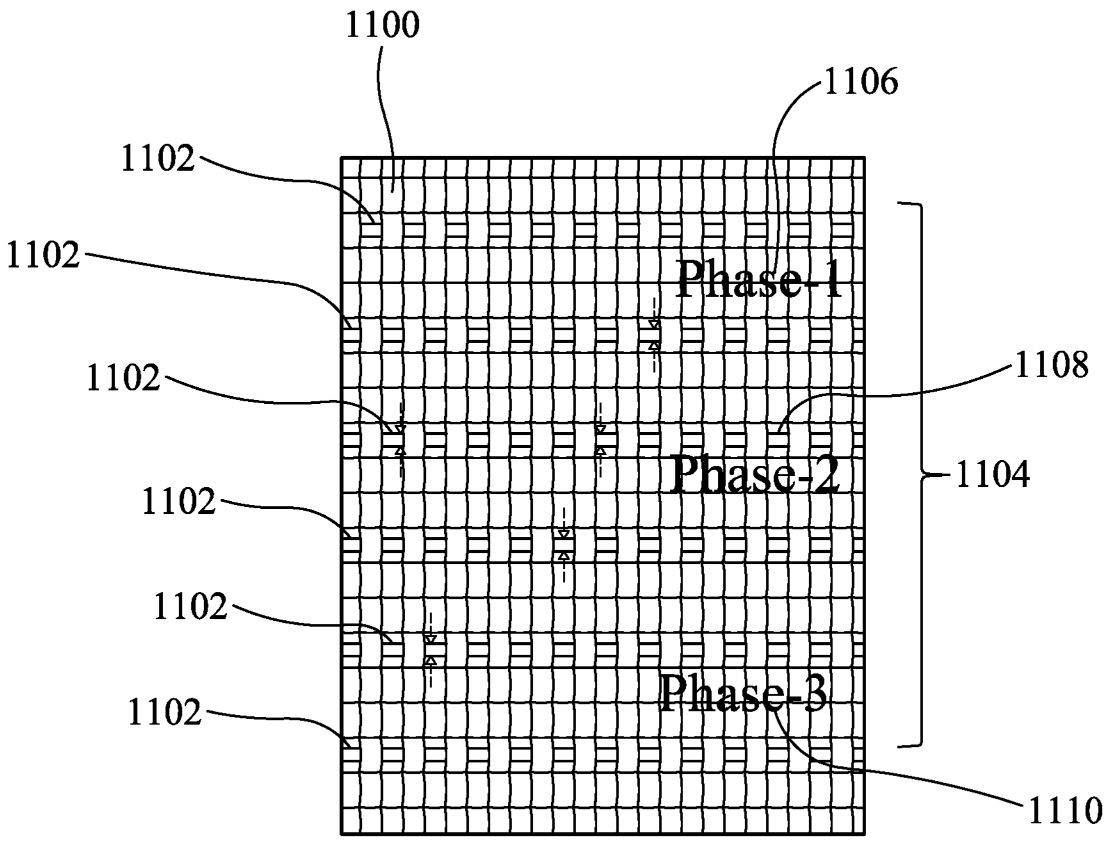
FIG. 11 is a front-view of an example of an implementation of an ortho-fabric-material with a plurality of CNT-fibers driven with multiple electrical waveforms in accordance with the present disclosure.

In FIG. 11, a front-view of an example of an implementation of an ortho-fabric-material 1100 with a plurality of CNT-fibers 1102 driven with multiple electrical waveforms is shown in accordance with the present disclosure. In this example, the plurality of CNT-fibers 1102 are driven by a low-frequency (for example 10 Hz) AC, multi-phase sinusoidal signal 1104 with three-phases among six CNT-fibers (phase-one 1106, phase-two 1108, and phase-three 1110).

Figure 12:
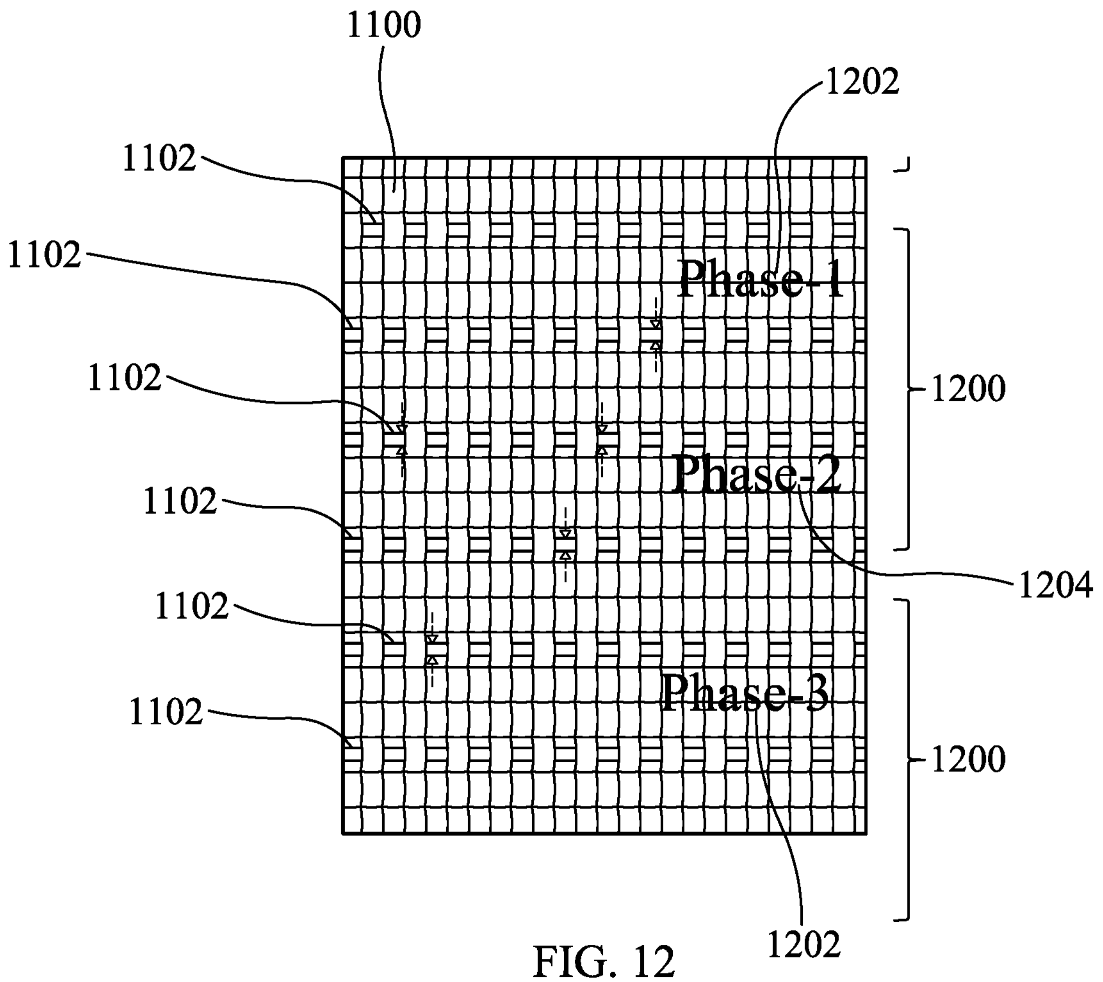
FIG. 12 is a front-view of an example of an implementation of an ortho-fabric-material with a plurality of CNT-fibers driven with another type of multiple electrical waveforms in accordance with the present disclosure.

Similarly, in FIG. 12, a front-view is shown of an example of an implementation of the ortho-fabric-material 1100 with the plurality of CNT-fibers 1102 driven with another type of multiple electrical waveforms in accordance with the present disclosure. In this example, the plurality of CNT-fibers 1102 are driven by a low-frequency (for example 10 Hz) AC, multi-phase sinusoidal signal 1200 with two-phases among four CNT-fibers (phase-one 1202 and phase-two 1204). These examples allow for wider-spectrum waveforms with random spectral components (in the range of 0.1 Hz to 100 Hz) distributed among clusters of CNT-fibers 1102.

Figure 13:
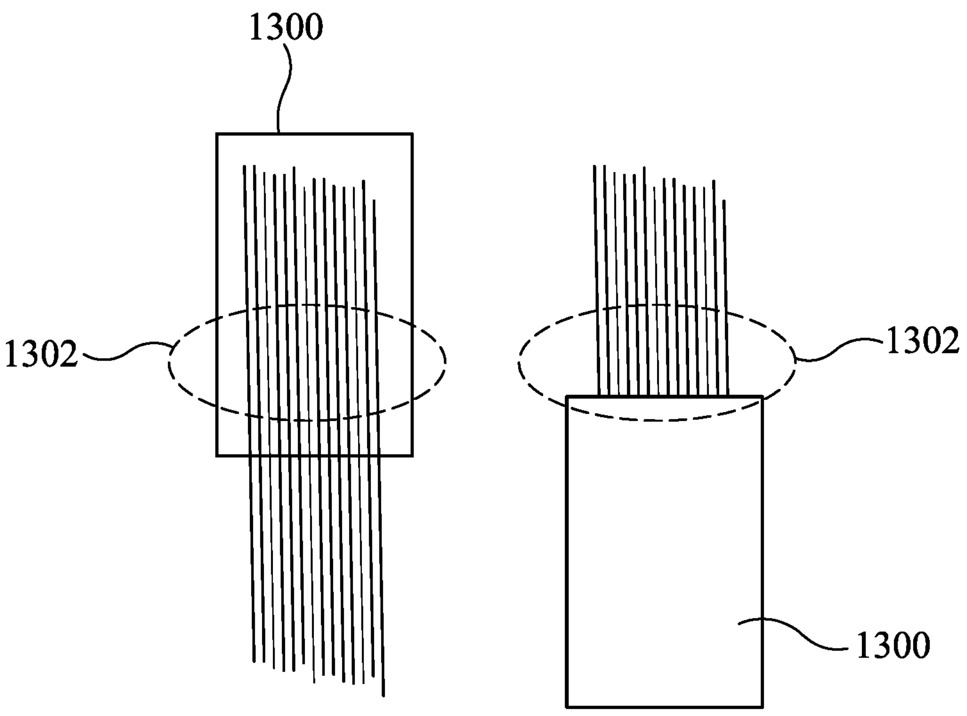
FIG. 13 is a front-view of an example of an implementation of a non-ortho-fabric-material with a plurality of CNT-fibers in accordance with the present disclosure.

In FIG. 13, a front-view of an example of an implementation of a non-ortho-fabric-material 1300 with a plurality of CNT-fibers 1302 is shown in accordance with the present disclosure.

Figure 14:
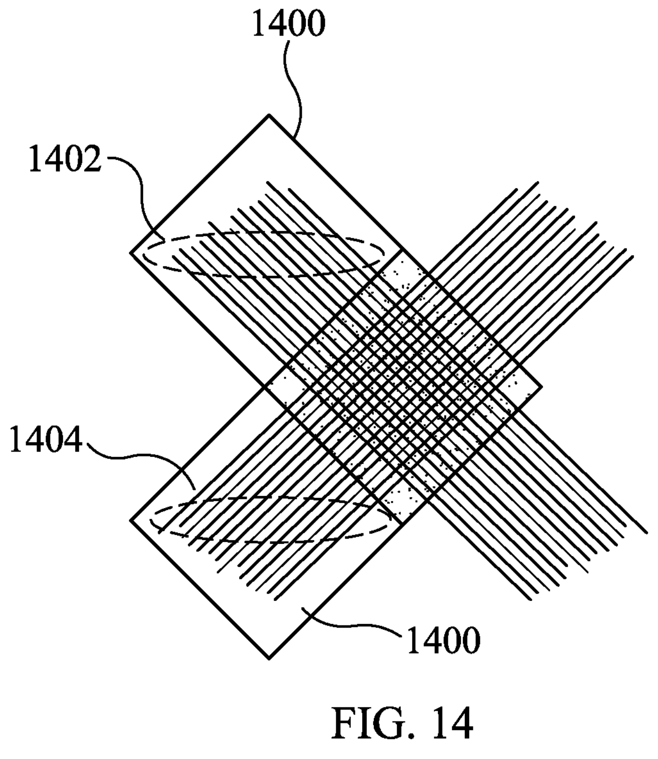
FIG. 14 is a front-view of an example of an implementation of a non-ortho-fabric-material with a plurality of CNT-fibers in accordance with the present disclosure.

In FIG. 14, a front-view of an example of an implementation of a non-ortho-fabric-material 1400 with a plurality of CNT-fibers 1402 and 1404 is shown in accordance with the present disclosure. The non-ortho-fabric-materials 1300 and 1400 may be substrates with ribbons having flexible fibers, oriented fibers of non-conductive material (as example nonconductive polymer), which has the CNT-fibers 1302, 1402, and 1404 embedded at predetermined intervals in a matrix. The ribbons may be stabilized with a backing made of matrix curing material. The non-ortho-fabric-materials 1300 and 1400 may alternatively be charged fabric fibers utilizing charged polymers that allow local enhancement of the electric-field 322 for complex geometric contours of the assembly. The non-ortho-fabric-materials 1300 and 1400 may also be conductive polymers with embedded CNT-fibers where the fabric-material is composed of two different types of fibers such as one strand of 2-ply that is conductive and one strand that is insulative. In general, materials used in the 1-ply strands and in the first (i.e., non-conductive) side of the two-ply strands should have a dielectric constant that does not significantly diminish the traveling-wave of the electric-field 322 presented in the first (i.e., nonconductive) side of the fabric-material. Additionally, the spacing, ordering, and pattern of non-conductive and conductive strands and the phasing and frequency of the input-signal-source 318 may be designed to tailor repelling and dispersing effects on the first (non-conductive) surface of the fabric-material. For example, to repel dust particle sizes between approximately 5 to 300 μm in lunar conditions, the ranges for conductive-fiber width are anticipated to be between approximately 0.5 to 400 μm, conductive-fiber spacing between approximately 0.3 to 4 mm, voltages between approximately 500 to 2,000V, frequency between approximately 5 to 200 Hz, and single to multiphase input signals. These parametric values may increase by a factor of approximately 3 to 5 for Earth applications to account for the effects of gravity, humidity and atmospheric conditions.

Figure 15:
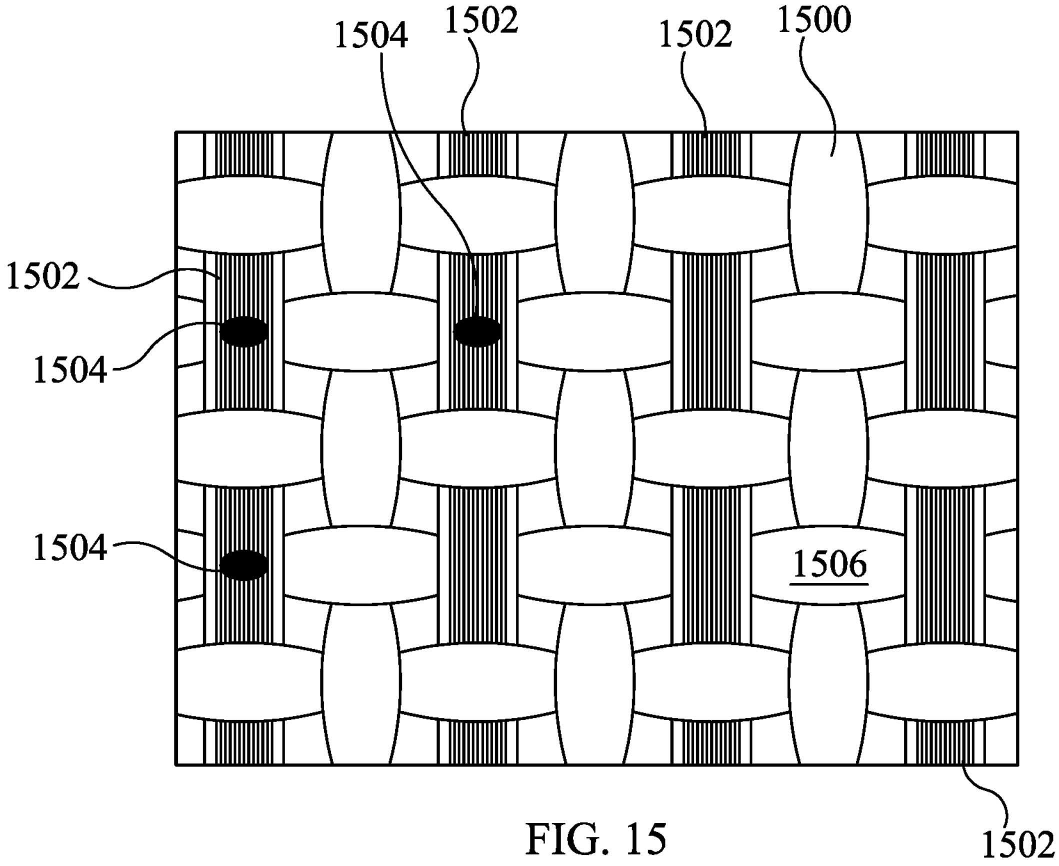
FIG. 15 is a front-view of an example of an implementation of an ortho-fabric-material with a plurality of CNT-fibers and plurality of sensors in accordance with the present disclosure.

Turning to FIG. 15, in FIG. 15 an amplified front-view of an example of an implementation of an ortho-fabric-material 1500 with a plurality of CNT-fibers 1502 and plurality of sensors 1504 is shown in accordance with the present disclosure. The sensors 1504 may be micro-sensors that are attached to the ortho-fabric-material 1500 or embedded within the plurality of CNT-fibers 1502. The sensors 1504 are configured to identify the amount of dust coverage that may then activate the DMS 300 with the AC voltage-signal 316 based on the pre-specified minimum dust coverage value. The sensors 1504 may sense the optical reflectively on the front-surface 1506 of the ortho-fabric-material 1500, change in mass, etc.

Figure 16:
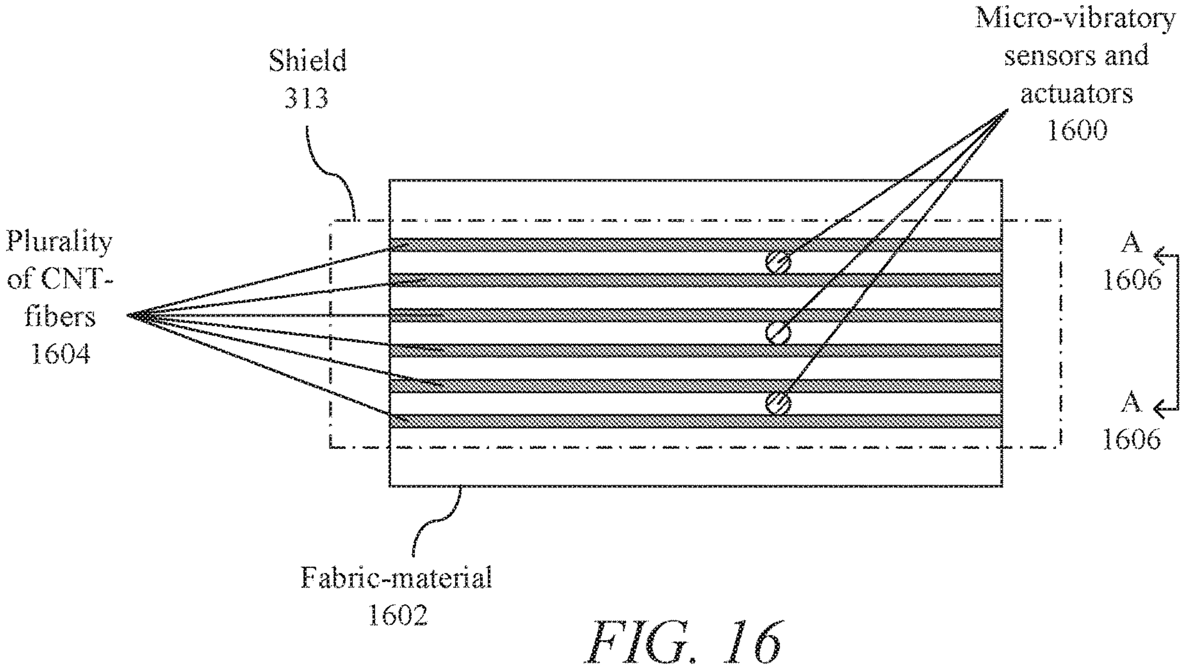
FIG. 16 is a top-view of a system block diagram is shown of an example of an implementation of micro-vibratory sensors and actuators embedded within the fabric-material or within the CNT-fibers that combine mechanical action with the electric-field to enhance dust repelling action of the DMS.

In FIG. 16, a top-view of a system block diagram is shown of an example of an implementation of micro-vibratory sensors and actuators 1600 embedded within the fabric-material 1602 or within the CNT-fibers 1604 (that are woven into the fabric-material 1602) that combine mechanical action with the electric-field 322 to enhance dust repelling action of the shield 313 of the DMS 300.

Figure 17:
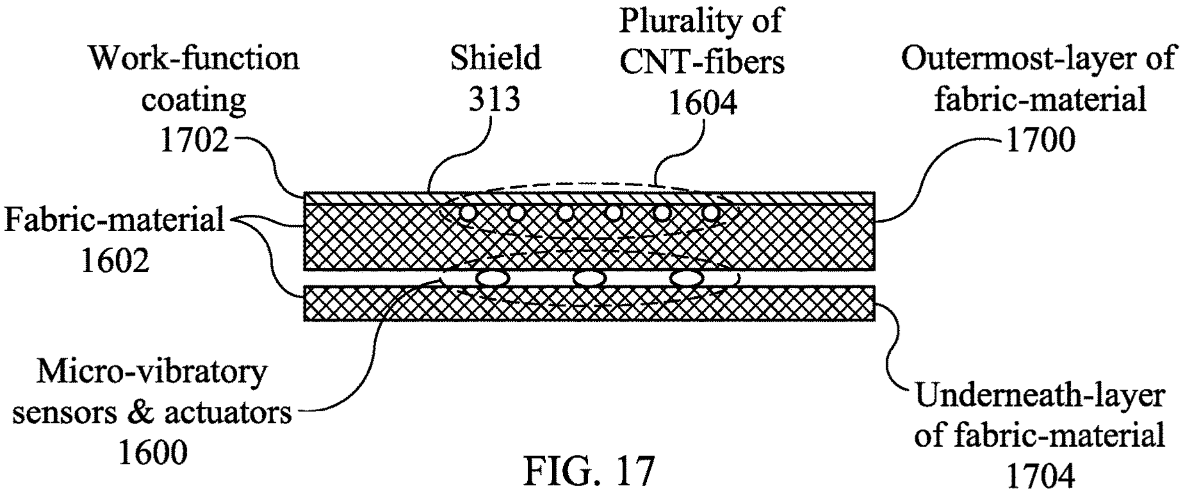
FIG. 17 is a front-view of the system block diagram shown in FIG. 16 of the micro-vibratory sensors embedded within the fabric-material or within the CNT-fibers in accordance with the present disclosure.

In FIG. 17, a front-view (along plane A-A 1606) is shown of the system block diagram shown in FIG. 16 of the micro-vibratory sensors and actuators 1600 embedded within the fabric-material 1602 or within the plurality of CNT-fibers 1604 in accordance with the present disclosure. The plurality of CNT-fibers 1604 (i.e., a series of approximately parallel CNT-fibers) are woven into the fabric-material 1602 which, in this example, may be the ortho-fabric-materials of a spacesuit. The fabric-material 1602 has an outermost layer 1700 and on top of the outermost-layer 1700 is a work-function coating 1702. The fabric-material 1602 also includes an underneath-layer 1704 of the fabric-material 1602 underneath the outermost-layer 1700. The micro-vibratory sensors and sensors 1600 are located between the outermost-layer 1700 and underneath-layer 1704. In this example, the DMS 300 combines a passive, electrostatic, and vibratory mechanical action to repel dust off of the shield 313.

Figure 18:
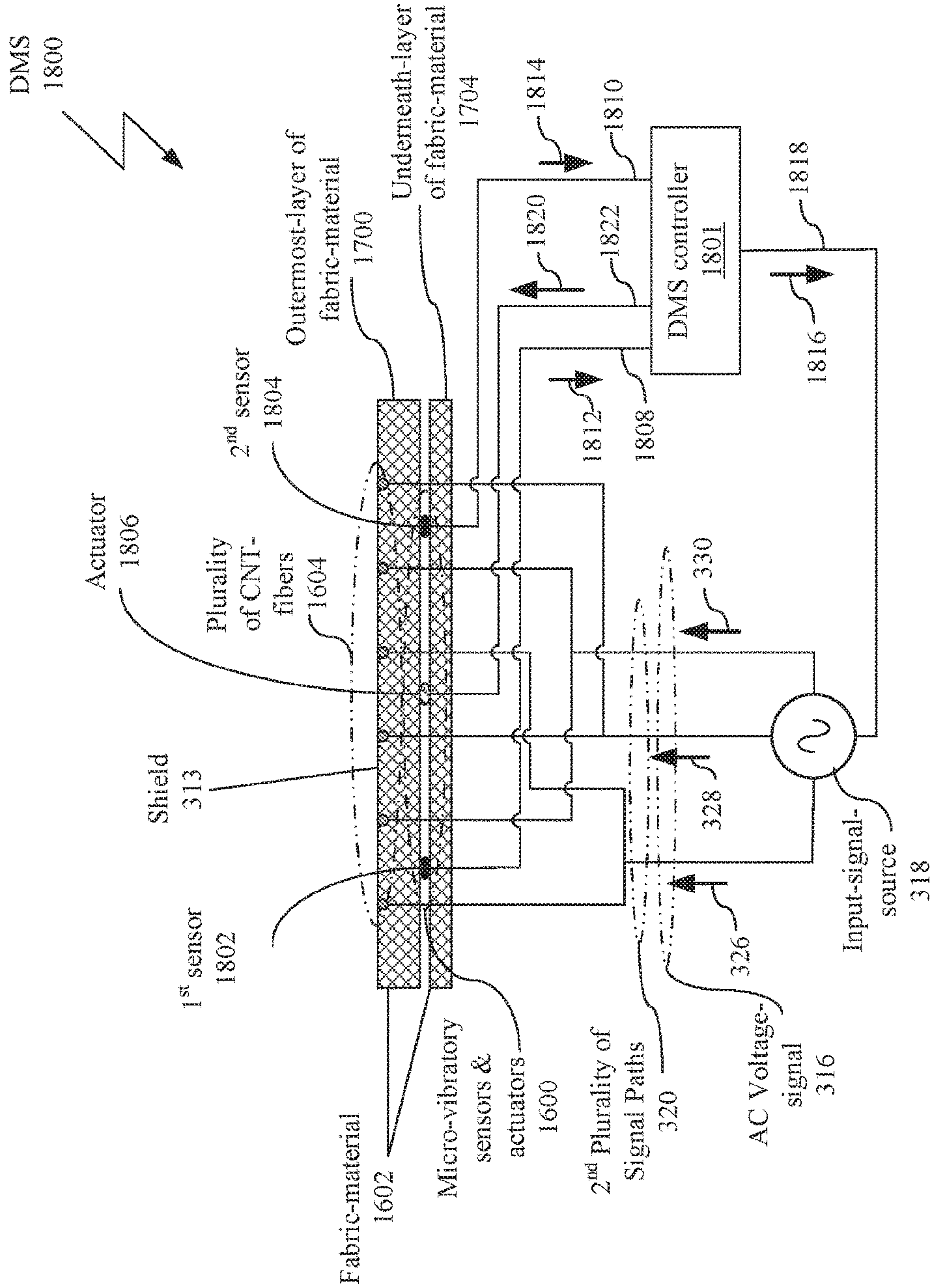
FIG. 18 is a side-view of a system block diagram of an example of an implementation of the DSM with a DMS controller and the micro-vibratory sensors and actuators shown if FIGS. 16 and 17 in accordance with the present disclosure.

Turning to FIG. 18, a side-view is shown of a system block diagram of an example of an implementation of the DMS 1800 with a DMS controller 1801 and the micro-vibratory sensors and actuators 1600 (shown in FIGS. 16 and 17) in accordance with the present disclosure. This example is similar to the example shown in FIG. 3A with the added elements of a first sensor 1802, a second sensor 1804, and an actuator 1806 within the micro-vibratory sensors and actuators 1600, and the DMS controller 1801. In this example, as described earlier, the DMS controller 1801 may be any general electronic controller that may include a microcontroller, a CPU based processor, DSP, an ASIC, FPGA, or other similar device or system. The first sensor 1802 and second sensor 1804 are devices capable of identifying the amount of dust particle 332 coverage on the shield 313 and then provide that information to the DMS controller 1801, which is in signal communication with the first and second sensors 1802 and 1804 via signal paths 1808 and 1810, respectively. The first and second sensors 1802 and 1804 may be micro-sensors that are powered by a DMS power supply (not shown) or by harvesting the mechanical energy from the motion of the wearer of the DMS 1800. The first and second sensors 1802 and 1804 determine the amount of dust particle 332 coverage on the shield 313 and provide that information to the DMS controller 1801 via sensor data signals 1812 and 1814 that are transmitted to the DMS controller 1801 via the signal paths 1808 and 1810, respectively. Once received by the DMS controller 1801, the DMS controller 1801 then determines if the AC voltage-signal 316 needs to be adjusted to change the characteristics of the electric-field 322 on the shield 313 to remove the dust particle 332 on the shield 313. If the AC voltage-signal 316 needs to be adjusted, the DMS controller 1801 sends an adjustment signal 1816 to the input-signal-source 318 via signal path 1818. Once received, the input-signal-source 318 modifies the waveform and/or frequency of the AC voltage-signal 316 (in response to the adjustment signal 1816) provided to the plurality of conductive-fibers 308 to optimize the dust mitigation properties of the DMS 1800. In addition, the DMS controller 1801 may provide an actuation/adjustment signal 1820 to the actuator 1806 via signal path 1822. Once received, the actuator 1806 will begin to provide mechanical work (e.g., vibrational energy) to the outermost-layer 1700 of the fabric-material 1602 to assist in dislodging and/or removing the dust particles 332 from the shield 313. In this example, the actuator 1806 may be a piezoelectric device (such as, for example, a micro-vibratory device) or some strands (not shown) within some of the conductive-fibers 308. The actuator 1806 may operate under the control of the DMS controller 1801, from inputs from the first and second sensors 1802 and 1804, or other control devices external to the DMS 1800. Similar to the first and second sensors 1802 and 1804, the actuator 1806 may be powered by the DMS power supply (not shown) or by harvesting the mechanical energy from the motion of the wearer of the DMS 1800.

In this example it is noted that only two sensors 1802 and 1804 and one actuator 1806 are shown for convenience in the illustration of FIG. 18. It is appreciated, that this is not a limitation and the DMS 1800 may include a plurality of sensors and a plurality of actuators below the outermost-layer 1700 of the fabric-material 1602 without limitation.

Another application for the DMS 1800 utilizing one or more actuators is the ability to remove sacrificial coatings (e.g., temporary or peel able solar-fabric, camouflage-fabric, coating needed for optical properties, water repellant, anti-radar, etc.) by producing high-frequency vibration or low-frequency curving with the plurality of actuators so assist to peel off of any sacrificial coatings from the front-surface of the fabric-material 1602.

In addition to sensors and actuators, the DMS 1800 may also include one or more micro-heaters (not shown) that are utilized to assist in the dust mitigation process or personal heating. The micro-heaters may be utilized to increase the resistivity of the plurality of conductive-fibers 308 or to provide heat to wearer of the DMS 1800 via heating the plurality of conductive-fibers 308. In the example of CNT-fibers for the plurality of conductive-fibers 308, the micro-heaters may be implemented as part of the plurality of conductive-fibers 308 that may be implemented either on the outermost-layer 1700 of the fabric-material 1602 or as a secondary plurality of conductive-fibers (not shown) in the underneath-layer 1704 of the fabric-material 1602. The micro-heaters are configured to produce a temperature on, or in, the fabric-material 1602 that may be controlled by the DMS controller 1801 or by direct inputs from the sensors within the fabric-material 1602. The micro-heaters may be powered by the DMS power supply.

It is further noted that the plurality of conductive-fibers 308 may also be utilized for radiation protection of the DMS 1800. In this example, the weave patterns of the plurality of conductive-fibers 308 is optimized and the input-signal-source 318 produces AC voltage-signals 316 that generate an electric-field that repels electrons, protons, or both. This application will utilize higher frequencies than the dust repellent application of the DMS 1800 and may be super-imposed on the plurality of conductive-fibers 308 to produce multiple types of waveforms with wider spectral range in a dual-use implementation. As an example, the patterns of the conductive-fibers may be varied to create different zones of spatial patterns of the conductive-fibers where the spatial separation of the conductive-fibers vary from zone-to-zone and the spatial separation of the applied waveforms of the AC voltage-signals vary from zone-to-zone.

Moreover, the plurality of conductive-fibers 308 may also be utilized for energy harvesting where the DMS 1800 may be incorporated in the fabric-materials of spacesuits, mountaineering clothing and equipment, and government and military suits and devices. In general, the plurality of conductive-fibers 308 may be tuned to operate in the frequencies for dust mitigation and a second frequency (or frequencies) for receiving ambient electromagnetic energy that may be rectified into harvested into received electrical power. In addition, in the case of CNT-fibers for the conductive-fibers, piezoelectric elements may be embedded within the CNT-fibers or the fabric-material to harvest mechanical energy from the movement of the wearer and transform it into electrical power. Furthermore, the CNT-fibers may be configured to receive ambient thermal energy (e.g., external heat-energy, radiation from the Sun, heat from the body of the wearer) which is converted to electrical power via the CNT-fibers acting as thermoelectric converters.

Moreover, the plurality of conductive-fibers 308 may also be utilized for anti-jamming applications in wearable communication systems or systems utilizing fabric-materials such as, for example, an antenna utilizing a fabric-material. In this case, the fabric-material and plurality of conductive-fibers may utilized in combination with a fabric based antenna system that may be part of a wearable communication system by utilizing CNT-fibers for the conductive-fibers. In this example, the CNT-fibers may operate as sensors capable of detecting a jamming signal or the DMS 1800 may also include embedded electric-field sensors capable of detecting the jamming signal. Once a jamming signal is detected, the DMS 1800 may include additional devices, components, or systems capable of producing an anti-jamming AC voltage-signal with a higher frequency than the frequencies produced by the DMS 1800 to mitigate the dust from the shield. In order to produce these anti-jamming AC voltage-signals, the DMS controller 1801 may be in signal communication with an external communication system.

Figure 19C:
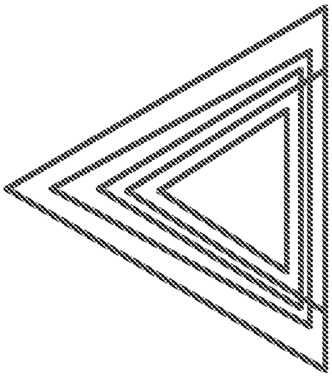
FIG. 19C is a front-view of an example of a third implementation of a printed flexible conductor and conductive-fiber pattern for use with the DMS in accordance with the present disclosure.
Figure 19B:
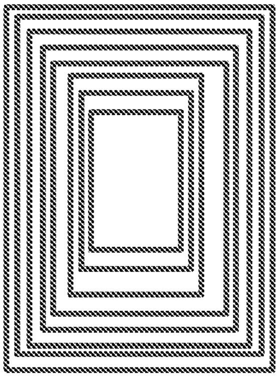
FIG. 19B is a front-view of an example of a second implementation of a printed flexible conductor and conductive-fiber pattern for use with the DMS in accordance with the present disclosure.
Figure 19A:
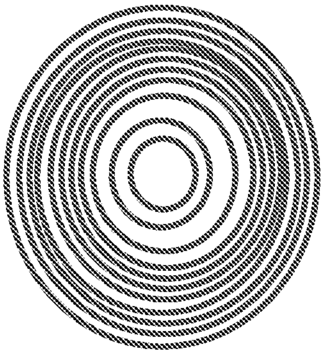
FIG. 19A is a front-view of an example of a first implementation of a printed flexible conductor and conductive-fiber pattern for use with the DMS in accordance with the present disclosure.

Turning to FIGS. 19A, 19B, and 19C, front-views of examples of different implementations of printed flexible conductor and/or conductive-fiber patterns are shown for use with the DMS 300 in accordance with the present disclosure. The patterns may be placed on the fabric-material and in signal communication with an active controller (i.e., the DMS controller) to better control dust repelling action. The various shapes provide varying optimizing dust repelling actions. The printed patterns may be then attached to a flexible-material, fabric-material, and/or surface of the appropriate dielectric properties.

It is appreciated by those of ordinary skill in the art that while most of the examples in this disclosure have been directed to spacesuits, the disclosure also applies to other types of devices that utilizes flexible-material or fabric-material such as electric fences, dust protection systems for wearable communication, radiation protection, thermal protection, umbrella antennas, tents, canopy surfaces, flexible solar collectors, flexible solar cells, self-cleaning antennas, deployable structures, inflatables, CNT-fiber embedded devices with piezoelectric-mechanical motion for mountaineering, etc.

As an example of operation, a few ortho-fabric-material test coupons of approximately three inches by three inches were applied with multiple configuration of DMS 300 to test the use of CNT-fibers as electrodes and the resulting dust removal capability when the electrodes were applied with a multi-phase AC voltage-signal.

Figure 20:
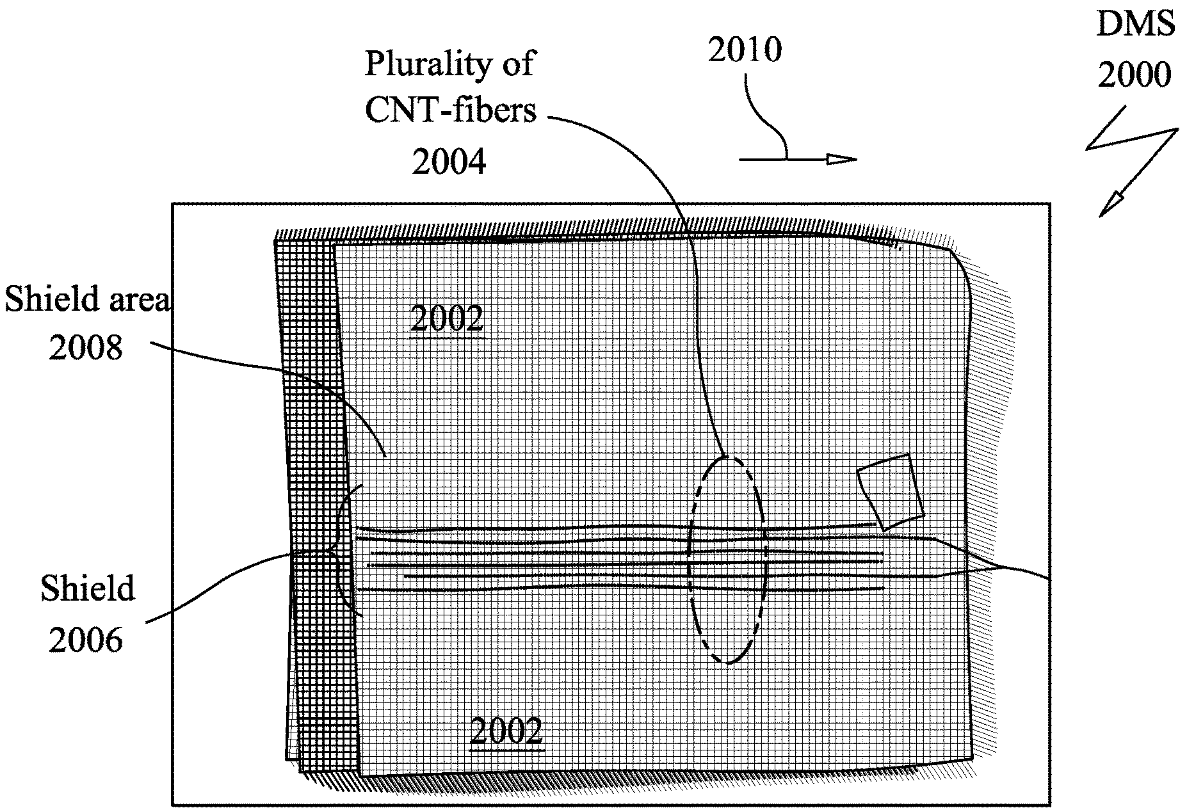
FIG. 20 is a top-view of an example of an implementation of the DMS utilizing an ortho-fabric-material for a spacesuit and a plurality of CNT-fibers for the plurality of conductive-fibers in accordance with the present disclosure.

FIG. 20 shows a top-view of an example of an implementation of the DMS 2000 utilizing an ortho-fabric-material 2002 for a spacesuit and a plurality of CNT-fibers 2004 for the plurality of conductive-fibers in accordance with the present disclosure. In this example, the plurality of CNT-fibers 2004 are woven into ortho-fabric-material 2002 within the shield 2006 that is defined by the shield area 2008. The plurality of CNT-fibers 2004 are directed along the first direction 2010.

Figure 21:
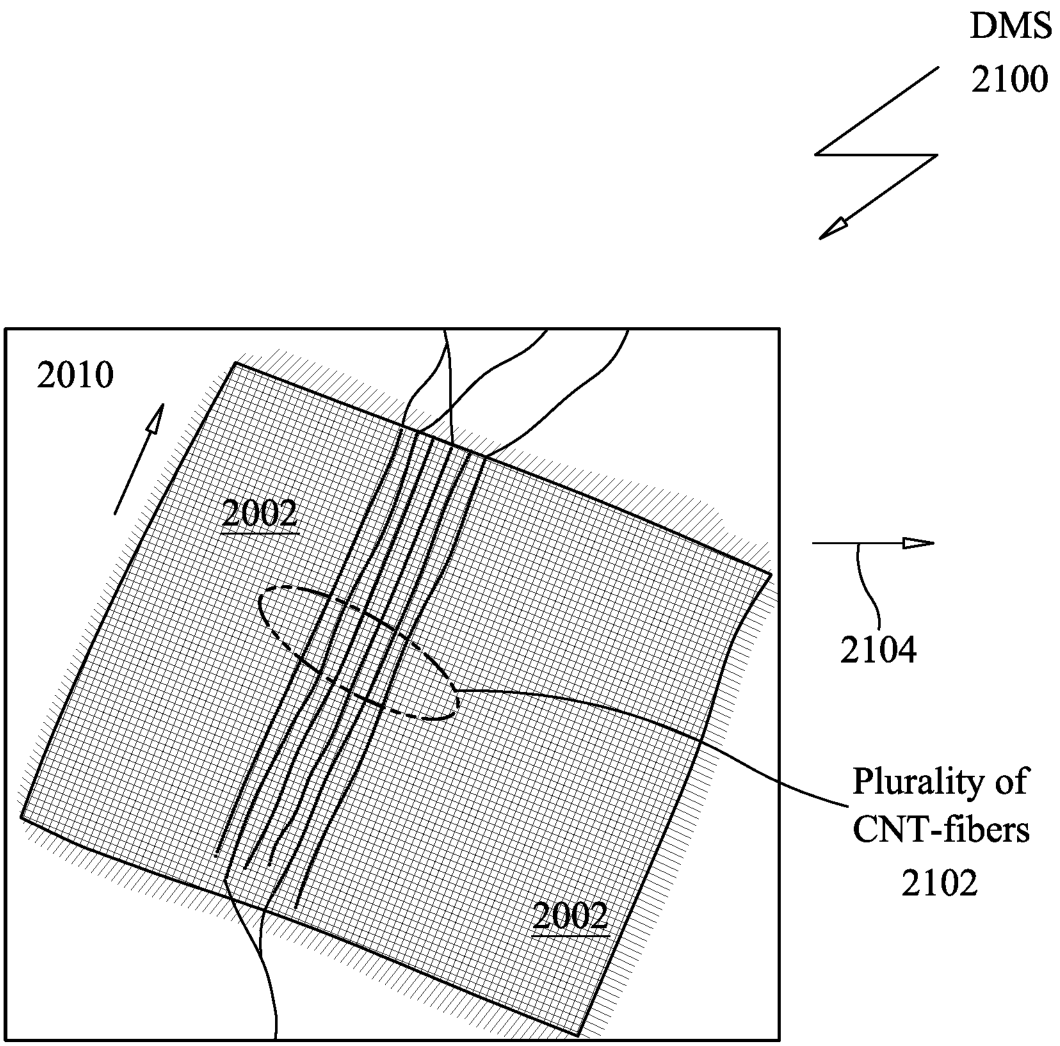
FIG. 21 is a top-view of an example of another implementation of the DMS utilizing the ortho-fabric-material for a spacesuit and a plurality of CNT-fibers for the plurality of conductive-fibers in accordance with the present disclosure.

In this example, the CNT-fibers of the plurality of CNT-fibers 2004 were produced from concentrated solutions of chlorosulfonic acid via wet-spinning. The CNT-fibers were assembled into twisted, multifilament yarns with a Planetary 3.0 rope-making apparatus from the Domanoff Workshop of Minsk, Belarus. The yarns utilized for this example consisted of 28 CNT-filaments plied together. In this example, the word "yarn" is interchangeable with "fibers" since each CNT-fiber consisted of 28 CNT-filaments. The individual CNT-filaments were about 26+/−2 μm in diameter and had an average linear density of approximately 0.82+/−0.2 tex. The conductivity of the individual CNT-filaments were about 2.1 MS/m (specific conductivity was approximately 1390 $Sm^2/kg$). While the plied yarns had approximately the same specific conductivity as individual CNT-filaments, the conductivity of the yarns decreased to about 1.1 MS/m because the density of the yarns was approximately 0.8 $g/cm^3$, compared to the about 1.5 $g/cm^3$ density of the individual CNT-filaments. In this example, the DMS 2000 was configured to be tested with a three-phase AC power supply for the input-signal-source (not shown). Similar to FIG. 20, FIG. 21 shows a top-view of an example of another implementation of the DMS 2100 utilizing the ortho-fabric-material 2002 for a spacesuit and a plurality of CNT-fibers 2102 for the plurality of conductive-fibers in accordance with the present disclosure. In FIG. 21, the plurality of CNT-fibers 2102 are shown as directed in an angled direction 2104 that is at an angle to the first direction 2010.

In an example of operation, the DMS 2000 was tested utilizing an input-signal-source that produced multi-phase AC voltage-signals that ranged between approximately 600V to 1,200V with very low current values in the order of micro-amps and had a frequency of approximately 10 Hz with a square waveform. The tests were conducted at room temperature and pressure utilizing the JSC-1A lunar simulant with a size range of approximately 50 μm to 75 μm and 10 μm to 50 μm. The specifications for the simulant were developed by Orbital Technologies Corporation of Madison, Wisconsin. While performing the tests, two methods of depositing the simulant over the DMS 2000 were utilized. The first method employed conductive-fiber (i.e., CNT-fibers) activation as the first step prior to dust deposition (i.e., deposition of the simulant), after which the simulant was continuously dropped (i.e., termed "drop-test") over the DMS 2000 to represent dynamic dust interacting with the spacesuit during an EVA operation. With the second method, approximately 10 mg of simulant was deposited over the shield area on the DMS 2000 covered with the plurality of CNT-fibers 2004 prior to the CNT-fibers being activated. This second test method represents a scenario where the dust statically adheres to the spacesuits during an EVA. In this example, it is noted that while the AC voltage-signal utilized were on the order of approximately 600V to 1,200V, the amount of current passing through the plurality of CNT-fibers 2004 was very low (i.e., on the order of micro-amps). The results of the tests showed that the DMS 2000 was capable of repelling lunar dust simulant with particle size between approximately 10 μm to 75 μm in both dynamic and static dust settings in ambient conditions (i.e., approximate temperature of 20° C., relative humidity of 68%, and Earth gravity). As a result, the tests demonstrated positive results for utilizing the DMS 2000 for repelling lunar dust simulant when applied with a multi-phase AC voltage-signal. It is noted that two-phase AC voltage-signals may also be utilized with DMS 2000 and DMS 2100. As an example, the DMS 2000 and DMS 2100 may utilize an input-signal-source that produces two-phase AC voltage-signal (with 180° phase shift) that ranges between approximately 600V to 1,200V with very low current values in the order of micro-amps and has a frequency of approximately 10 Hz with a square waveform.

Figure 22:
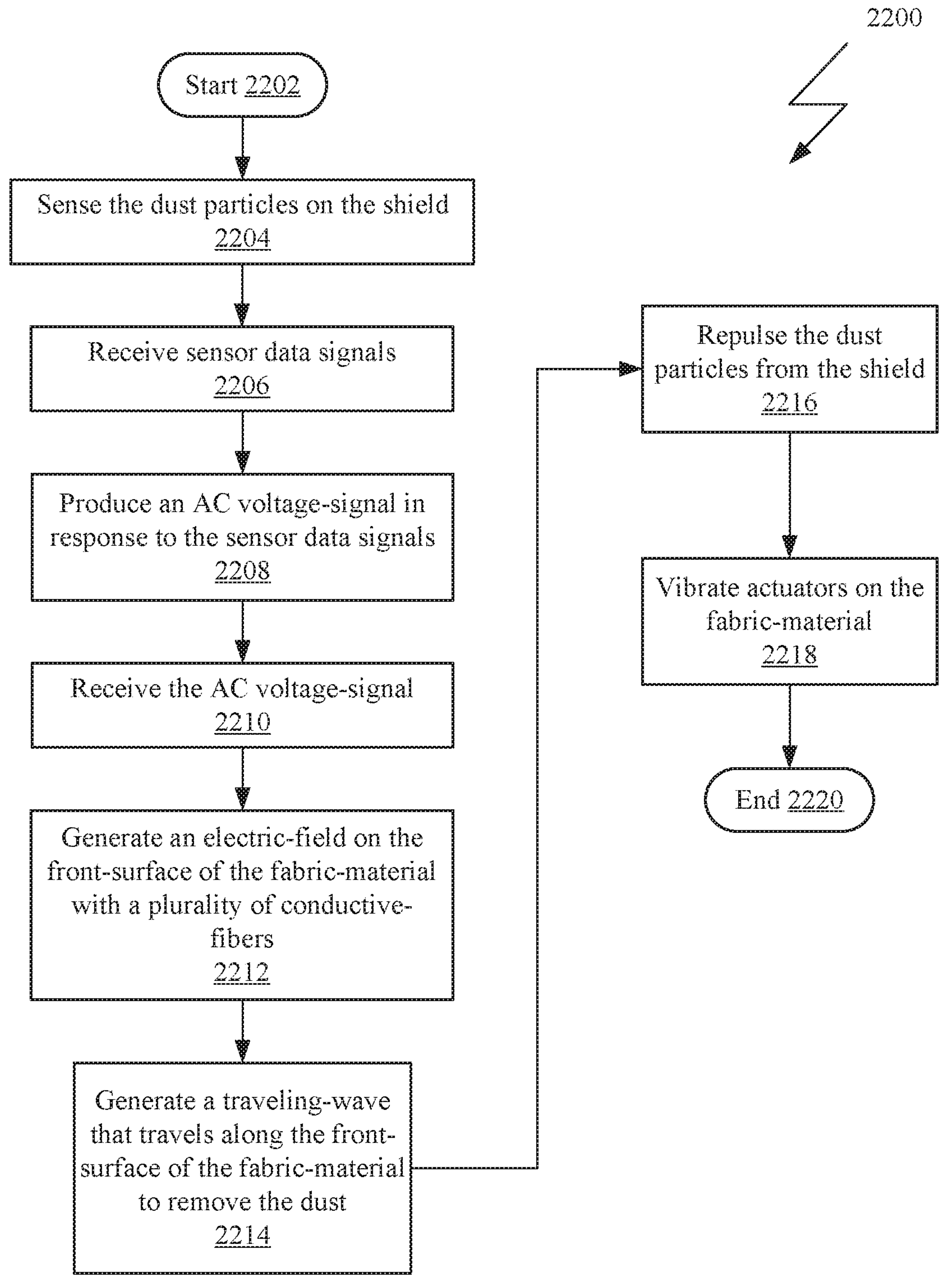
FIG. 22 is a flowchart illustrating an example of an implementation of a method of dust mitigation performed by the DMS in operation in accordance with the present disclosure.

In FIG. 22, a flowchart is shown illustrating an example of an implementation of a method 2200 of dust mitigation performed by the DMS 1800 in operation in accordance with the present disclosure. In this example, the DMS 1800 will be assumed to be the DMS 1800 shown in FIG. 18 that includes the micro-vibratory sensors and actuators 1600.

The method begins 2202 by sensing 2204 any dust particles with the sensors 1802 and 1804 within the fabric-material 1602. If the sensors 1802 and 1804 detect dust particles on the shield 313 of the fabric-material 1602, the sensors 1802 and 1804 send sensor data signals 1812 and 1814 to the DMS controller 1801. The DMS controller 1801 receives 2206 the sensor data signals 1812 and 1814 and, in response, activates the plurality of conductive-fibers (i.e., the plurality of CNT-fibers 1604) by sending an adjustment signal 1816 to the input-signal-source 318 that produces 2208 the AC voltage-signal in response to the adjustment signal 1816. Once the AC voltage-signal is received 2210 at the plurality of input-nodes 310 (described in relation to FIG. 3A) of the fabric-material 1602, the AC voltage-signals are passed to the plurality of conductive-fibers that corresponding generate 2212 an electric-field on the front-surface of the fabric-material 1602. The electric-field corresponding generates 2214 a traveling-wave that travels along the front-surface of the fabric-material 1602 in a direction that is traverse to the direction that the conductive-fibers run along the fabric-material 1602. This traveling-wave repulses 2216 the dust particles from the shield of the DMS 1800. In additional, based on the sensor data signals 1812 and 1814, the DMS controller 1801 may also send the actuation/adjustment signal 1820 to the actuator 1806 to cause the actuator 1806 to vibrate 2218 under the outermost-layer 1700 of the fabric-material 1602 in order to assist is losing and removing any dust from the shield. The process then ends 2220.

It will be understood that various aspects or details of the implementations may be changed without departing from the scope of the disclosure. It is not exhaustive and does not limit the claimed disclosure to the precise form(s) disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure.

What is claimed is:

1. A Dust Mitigation System (DMS) comprising:

a material selected from a group consisting of: a flexible material and a fabric material, wherein the material has a front-surface;

a plurality of conductive-fibers coupled to the material, wherein the plurality of conductive-fibers extend in a first direction along the material; and a plurality of input-nodes in signal communication with the plurality of conductive-fibers and configured to receive an alternating-current (AC) voltage-signal from an input-signal-source, and wherein the plurality of conductive-fibers are configured to generate:

an electric-field on the front-surface of the material in response to the plurality of input-nodes receiving the AC voltage-signal from the input-signal-source, and a traveling-wave, from the electric-field, that travels along the front-surface of the material in a second direction that is transverse to the first direction.

2. The DMS of claim 1, wherein the plurality of conductive-fibers are a plurality of carbon nanotube (CNT) fibers.

3. The DMS of claim 2, wherein the plurality of conductive-fibers comprise a plurality of side fibrils that are randomly arranged, frayed strand portions of the plurality of CNT fibers.

4. The DMS of claim 1, wherein the plurality of conductive-fibers are approximately parallel in the first direction.

5. The DMS of claim 1, further comprising:

the input-signal-source in signal communication with the plurality of conductive-fibers; and a DMS controller in signal communication with the input-signal-source, wherein the input-signal-source is configured to produce the AC voltage-signal having a plurality of AC phased-signals that are transmitted to the plurality of input-nodes, and wherein the DMS controller is configured to control a voltage, a frequency, and a phase of each AC phased-signal of the plurality of AC phased-signals.

6. The DMS of claim 5, further including a sensor in signal communication with the DMS controller wherein the sensor is configured to produce a sensor data signal, and wherein the DMS controller is configured to receive the sensor data signal and, based on the sensor data signal, cause the input-signal-source to adjust at least one parameter selected from among a group consisting of: the voltage, the frequency, and the phase of each AC phased-signal.

7. The DMS of claim 1, wherein the material defines at least a portion of a spacesuit.

8. The DMS of claim 1, wherein the material defines at least a portion of a device selected from a group of devices consisting of: an eclectic fence, a wearable communication device, a radiation protection device, a thermal protection device, an umbrella antenna, a space habitat, a tent, a canopy surface, a flexible solar collector, a flexible solar cell, a self-cleaning antenna, a deployable structures, and an inflatable.

9. The DMS of claim 1, further comprising a plurality of actuators that are configured to perform mechanical work on the material to assist in moving one or more dust particles on the front-surface of the material.

10. The DMS of claim 1, further comprising a top-layer coating covering the front-surface and the plurality of conductive-fibers.

11. The DMS of claim 10, wherein the top-layer coating comprises an insulating material.

12. The DMS of claim 1, wherein the plurality of conductive-fibers comprise one or more piezoelectric elements are configured to transduce mechanical movement of the material to electrical power.

13. The DMS of claim 1, wherein the plurality of conductive-fibers are configured as thermoelectric converters that transduce ambient thermal energy to electrical power.

14. The DMS of claim 1, wherein an angle between the first direction and the second direction is 90 degrees.

15. The DMS of claim 1, wherein an angle between the first direction and the second direction is between approximately 80 degrees to approximately 120 degrees.

16. A Dust Mitigation System (DMS) comprising:

a material selected from a group consisting of: a flexible material and a fabric material, wherein the material has a front-surface;

a plurality of conductive-fibers coupled to the material, wherein the plurality of conductive-fibers extend in a first direction along the material; and an input-signal source in signal communication with the plurality of conductive-fibers and configured to supply an alternating-current (AC) voltage-signal to the plurality of conductive-fibers, and wherein the plurality of conductive-fibers are configured to generate:

an electric-field on the front-surface of the material in response to the AC voltage-signal from the input-signal source, and a traveling-wave, from the electric-field, that travels along the front-surface of the material in a second direction that is transverse to the first direction.

17. The DMS of claim 16, wherein the plurality of conductive-fibers are a plurality of carbon nanotube (CNT) fibers.

18. A method for mitigating dust with a dust mitigation system (DMS), wherein the DMS includes (i) a material selected from a group consisting of: a flexible material and a fabric material, and (ii) a plurality of conductive-fibers within the flexible material in a first direction along the flexible material, wherein the material has a front-surface, the method comprising:

supplying an alternating-current (AC) voltage-signal from an input-signal-source to the plurality of conductive-fibers;

generating, using the AC voltage-signal, an electric-field on the front-surface of the material with the plurality of conductive-fibers; and generating a traveling-wave, from the electric-field, that travels along the front-surface of the material in a second direction that is transverse to the first direction.

19. The method of claim 18, further comprising adjusting a phase of the AC voltage-signal to adjust an angle of the second direction relative to the first direction.

20. The method of claim 18, further comprising transducing, using the plurality of conductive-fibers, (i) at least one of mechanical energy or thermal energy to (ii) an electrical power.

* * * * *